May 31, 1960 M. P. CHAPLIN 2,938,582
APPARATUS FOR MAKING MOLDED PULP ARTICLES
Filed Sept. 29, 1953 19 Sheets-Sheet 6

INVENTOR.
MERLE P. CHAPLIN
BY
Cornelius Zabriskie
ATTORNEY

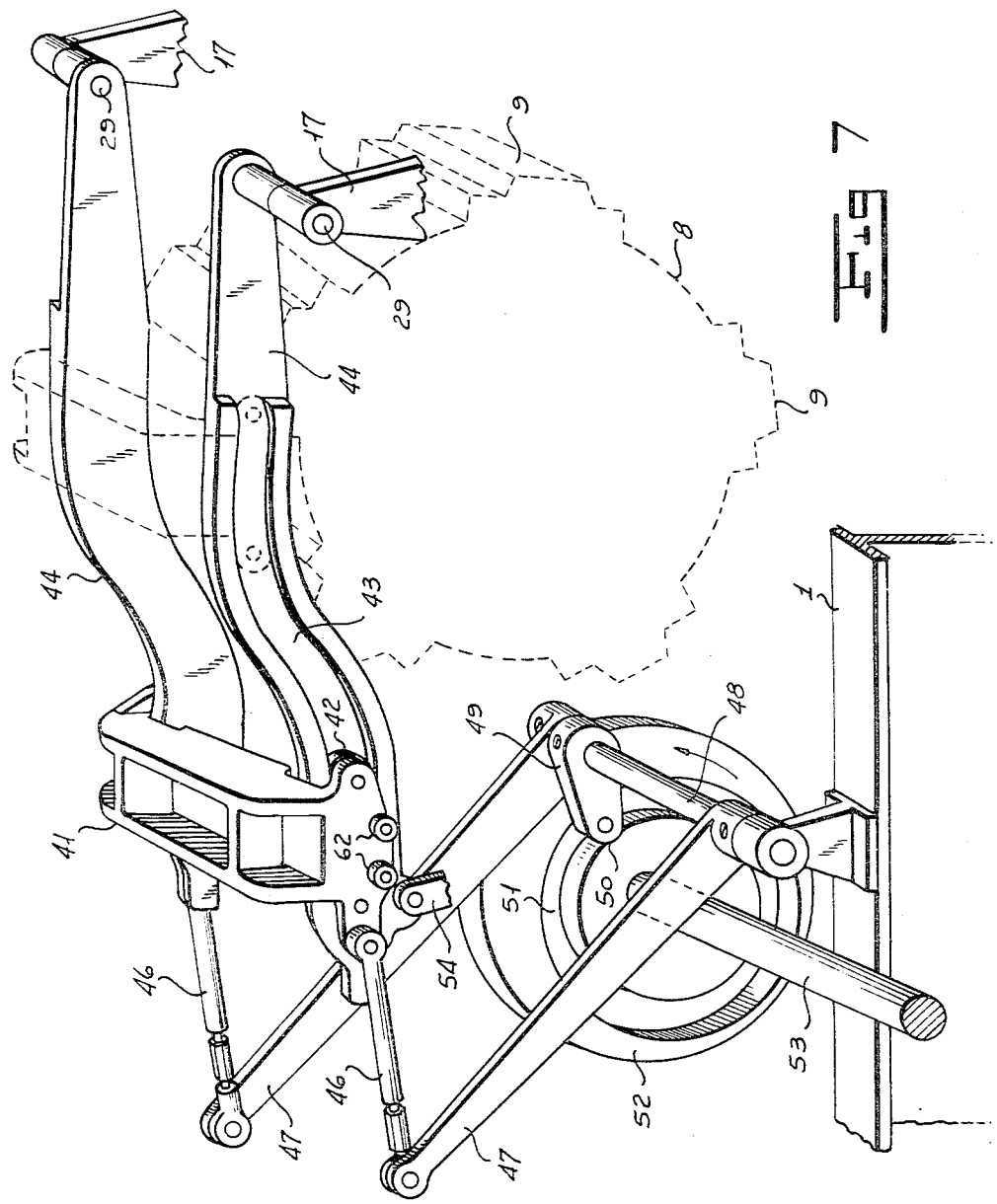

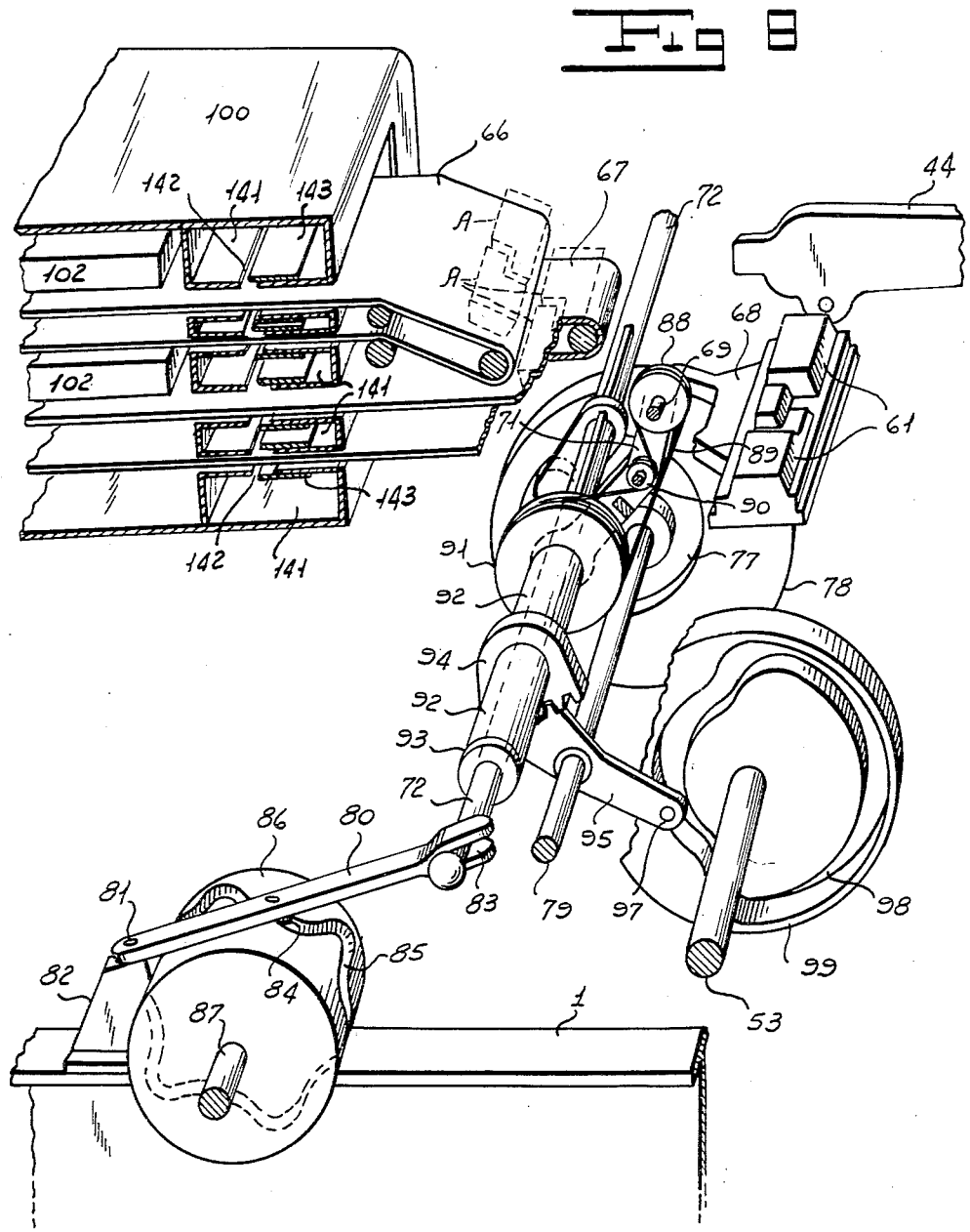

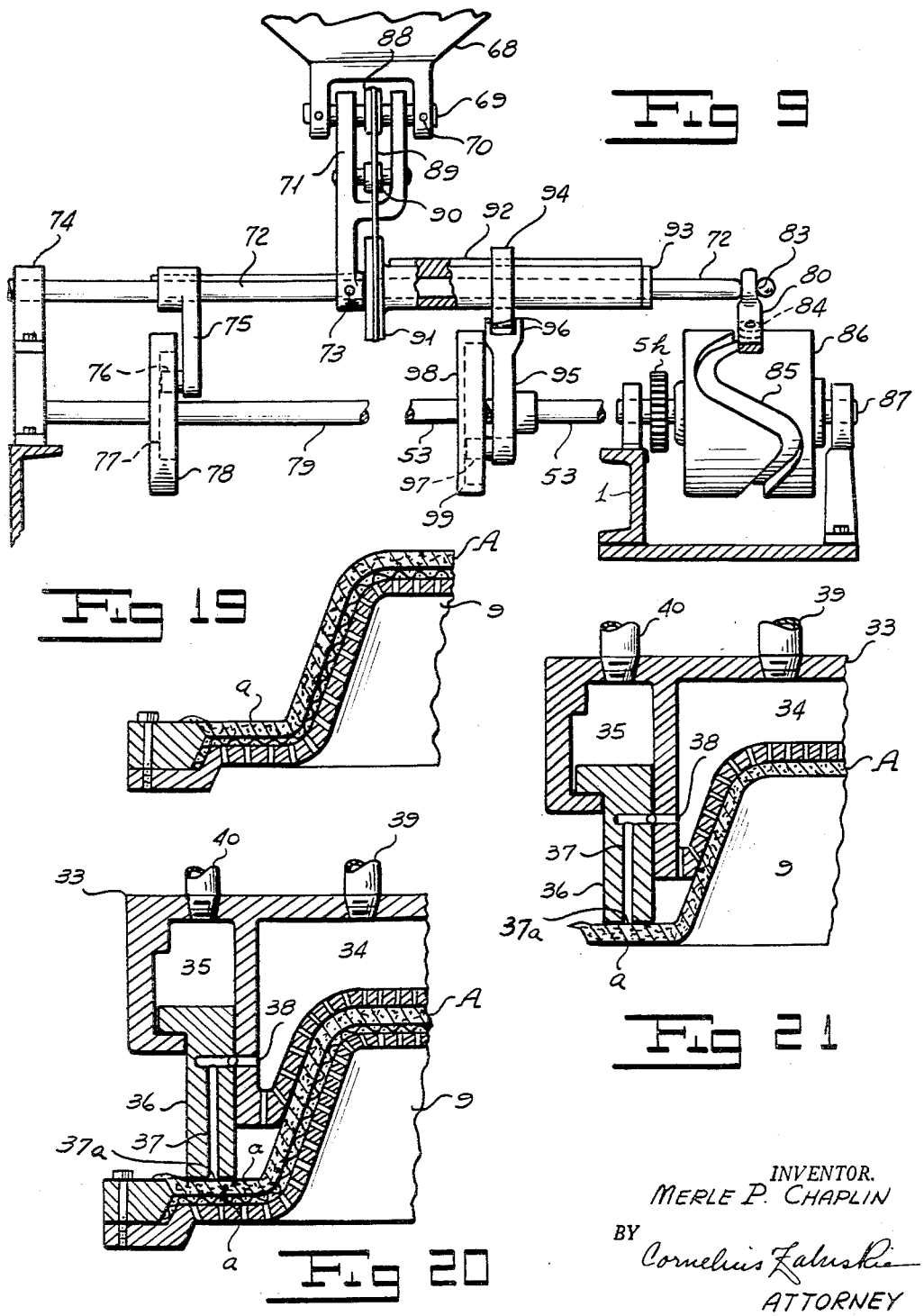

May 31, 1960  M. P. CHAPLIN  2,938,582
APPARATUS FOR MAKING MOLDED PULP ARTICLES
Filed Sept. 29, 1953  19 Sheets-Sheet 10
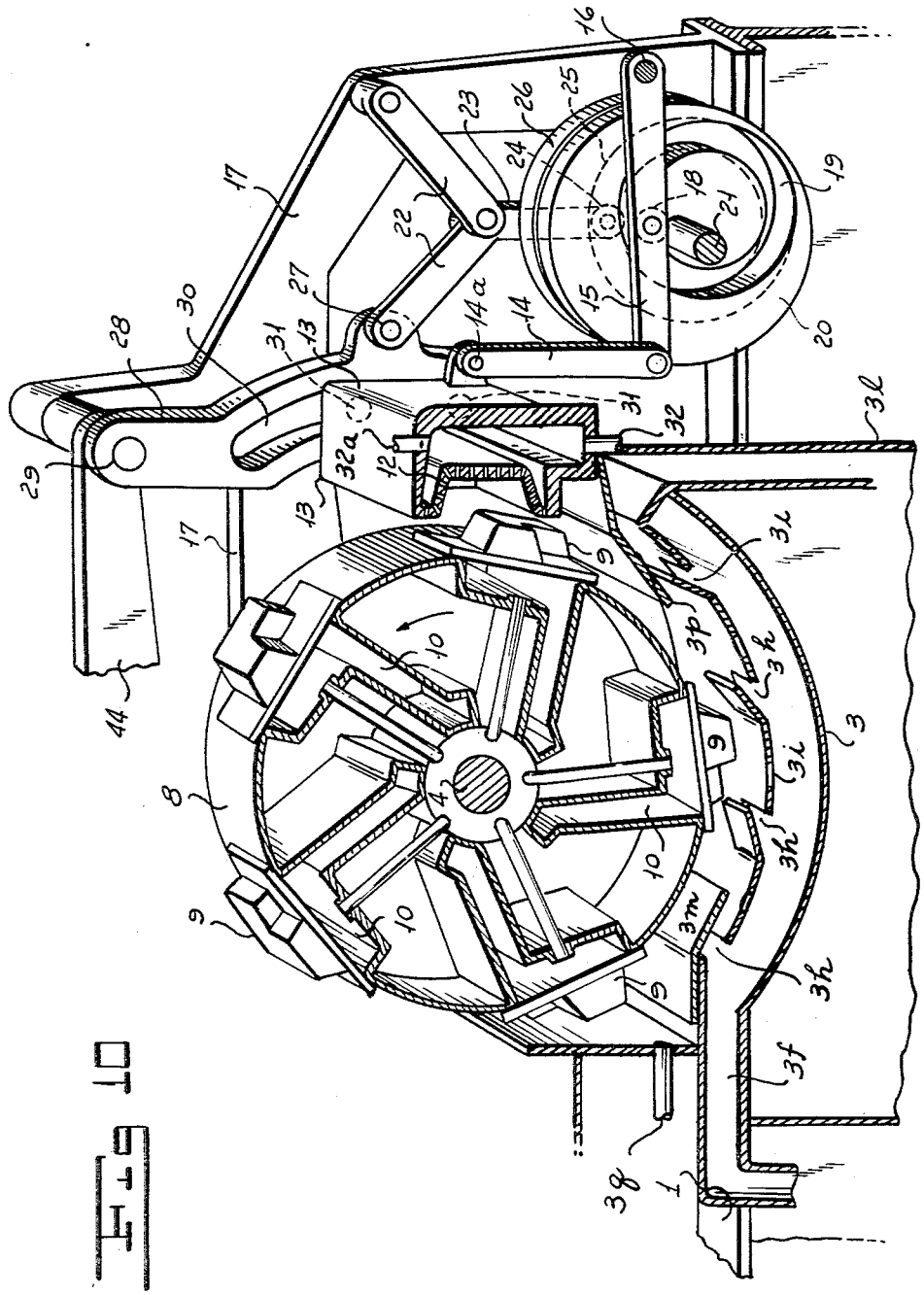
INVENTOR.
MERLE P. CHAPLIN
BY
Cornelius Zabuske
ATTORNEY May 31, 1960 M. P. CHAPLIN 2,938,582
APPARATUS FOR MAKING MOLDED PULP ARTICLES
Filed Sept. 29, 1953 19 Sheets-Sheet 11
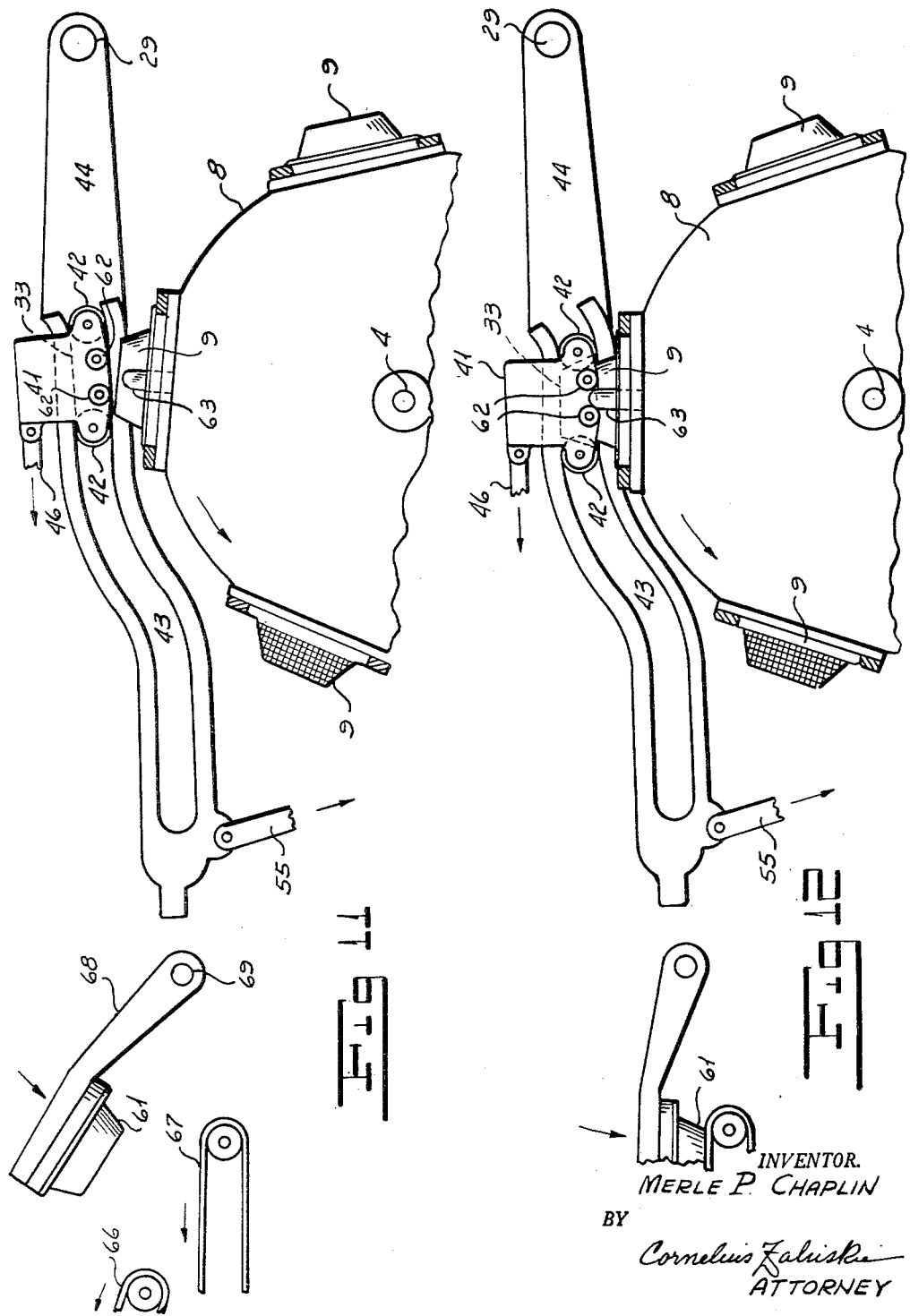
INVENTOR.
MERLE P. CHAPLIN
BY Cornelius Zaliski
ATTORNEY

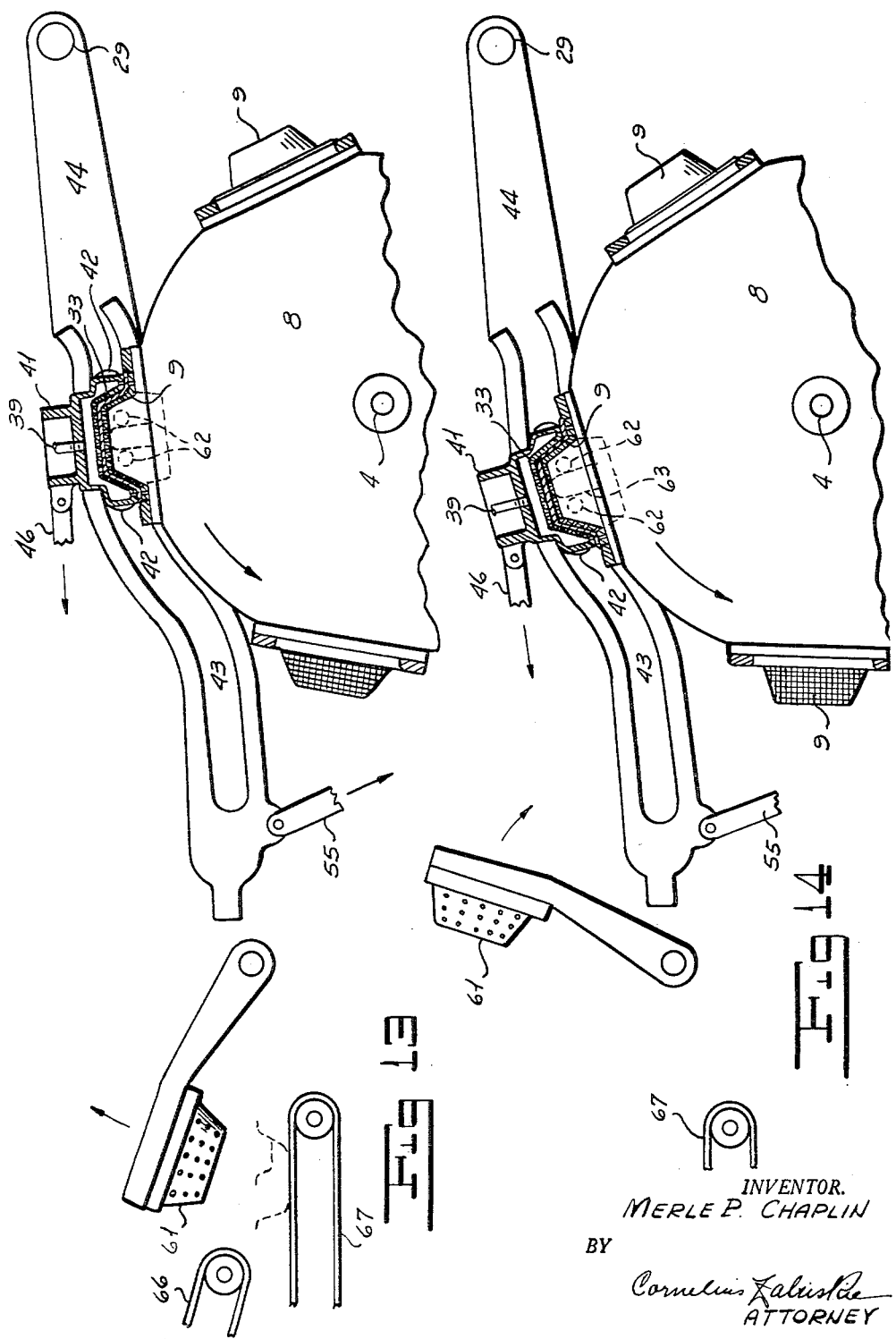

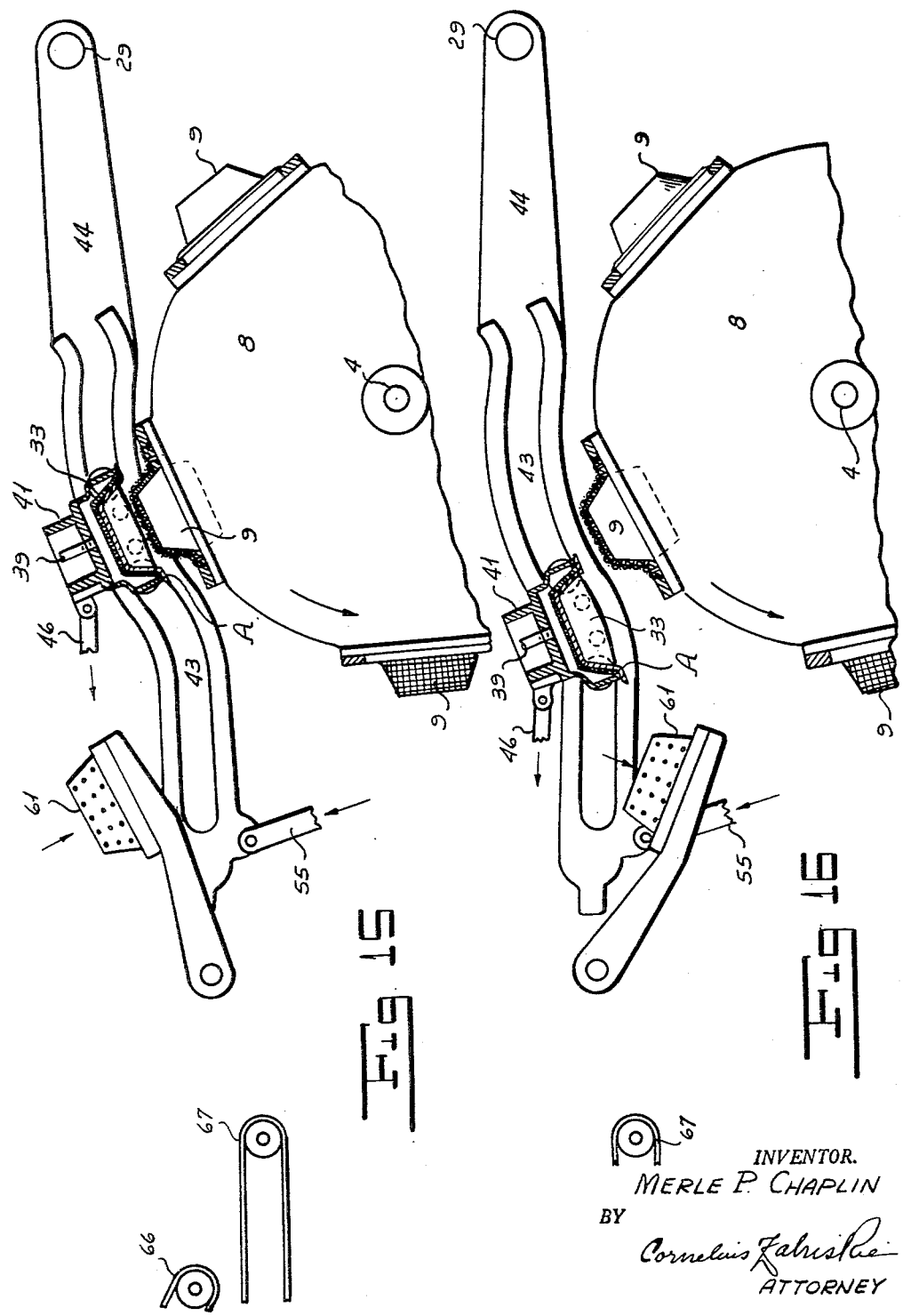

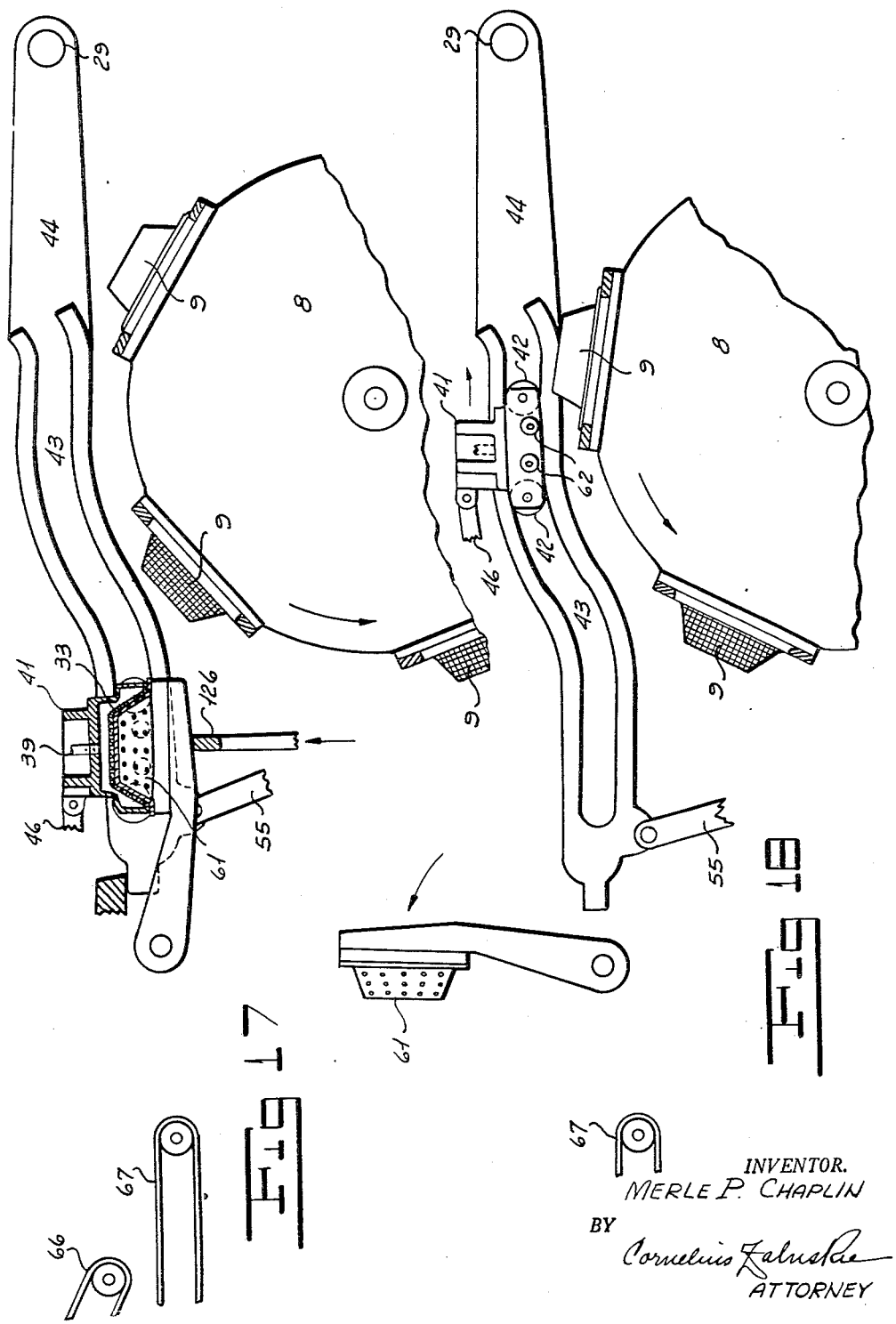

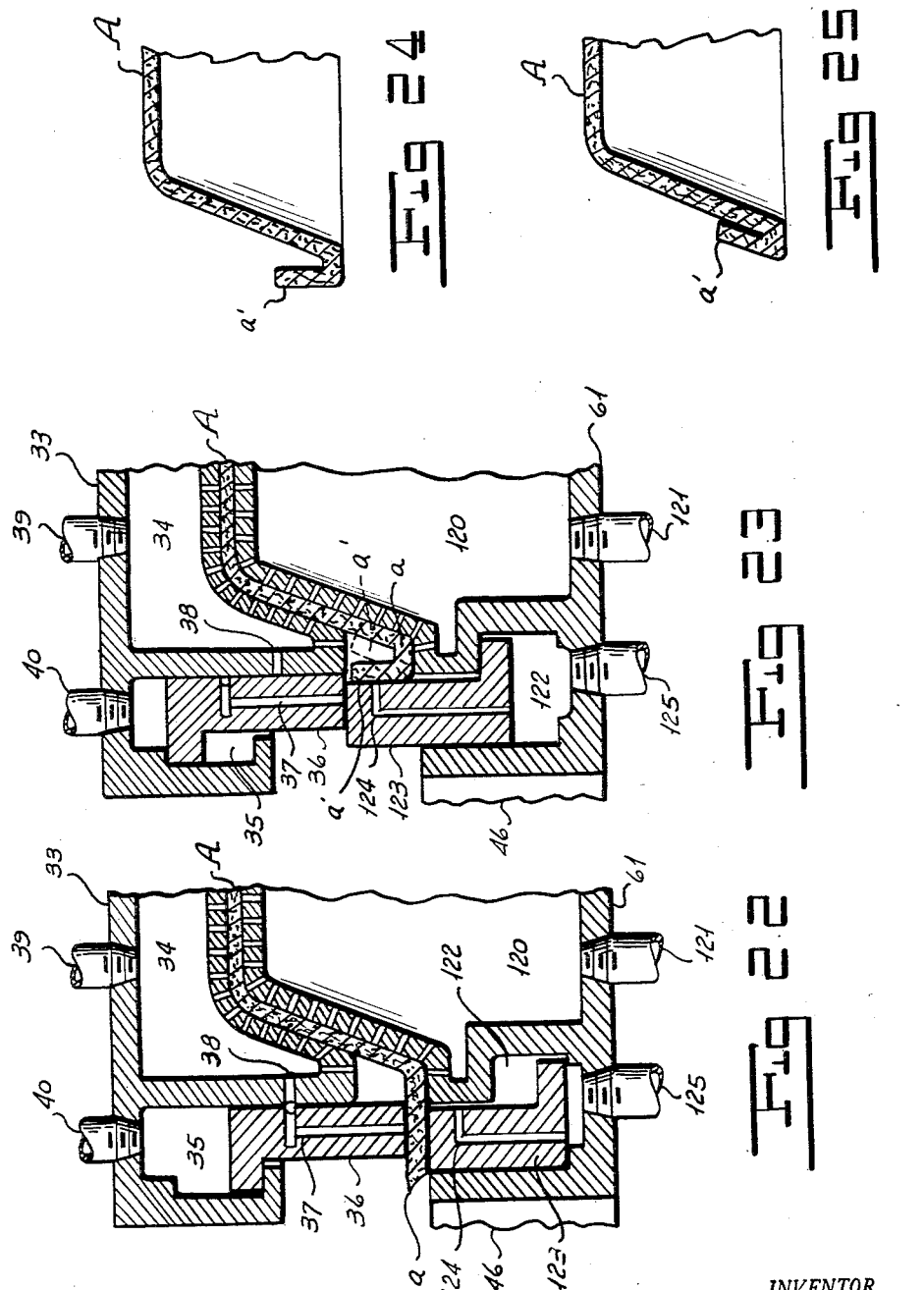

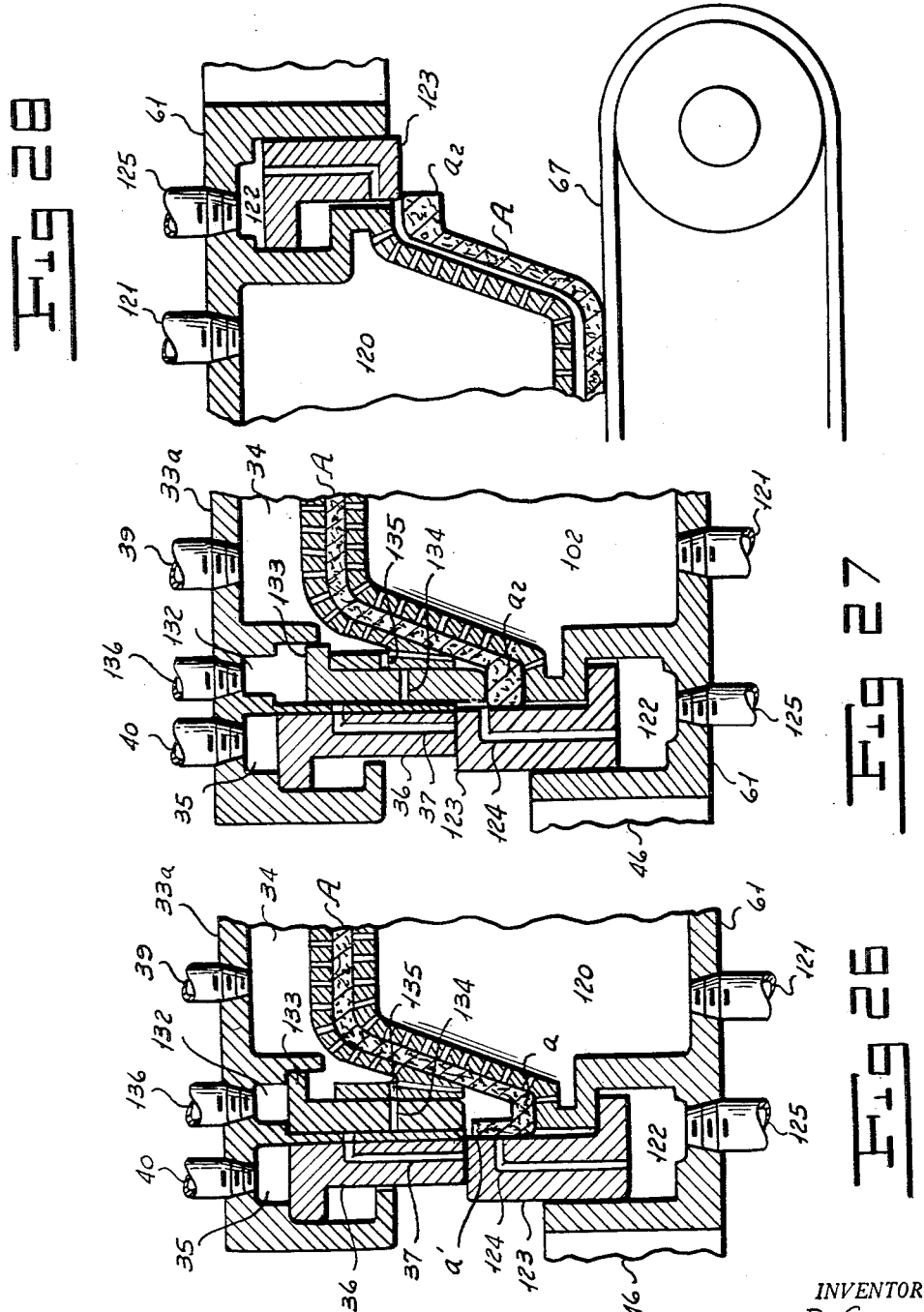

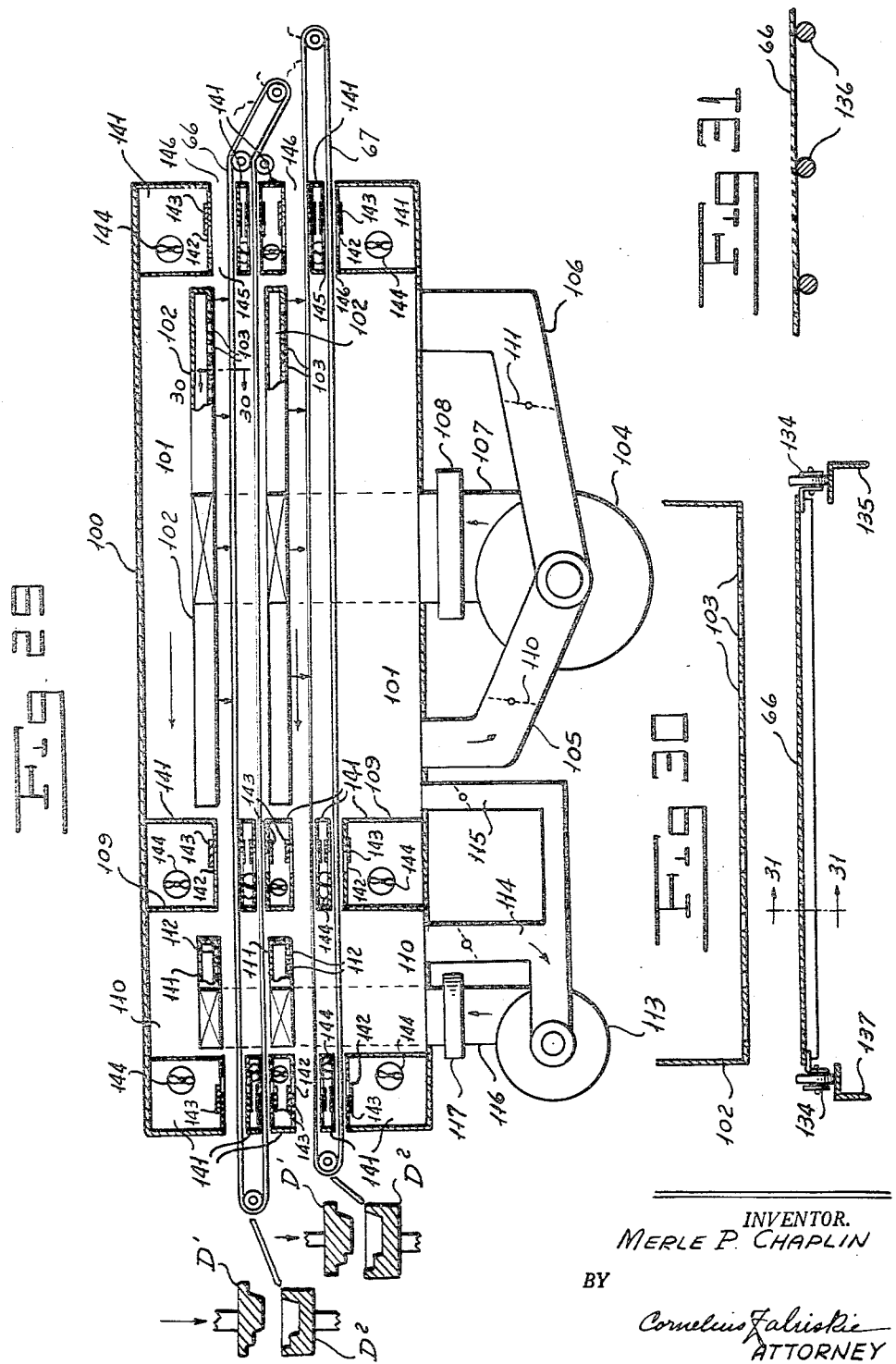

Fig. 32
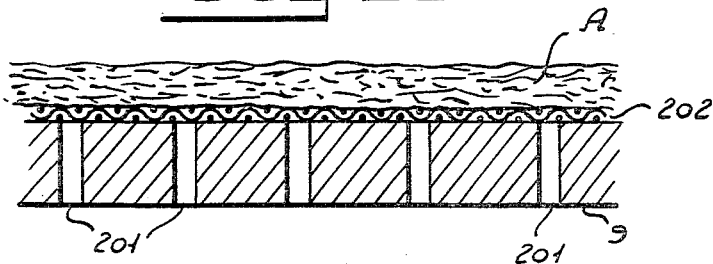
Fig. 33
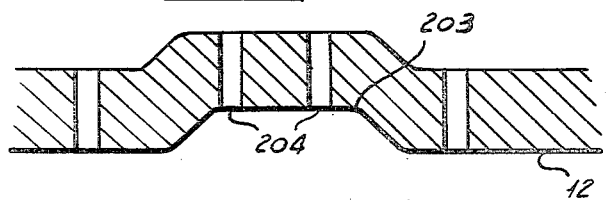
Fig. 34
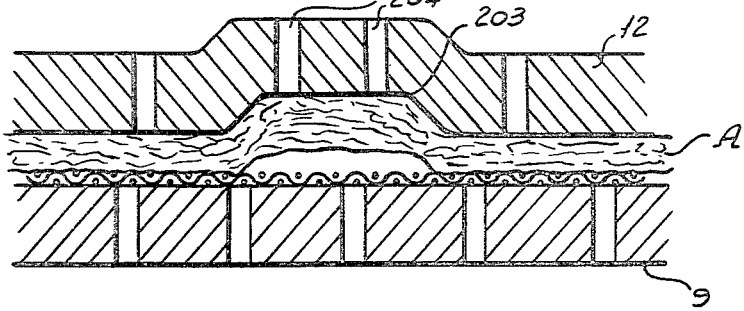
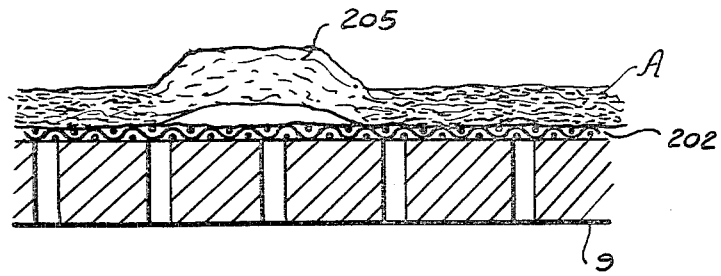
Fig. 35

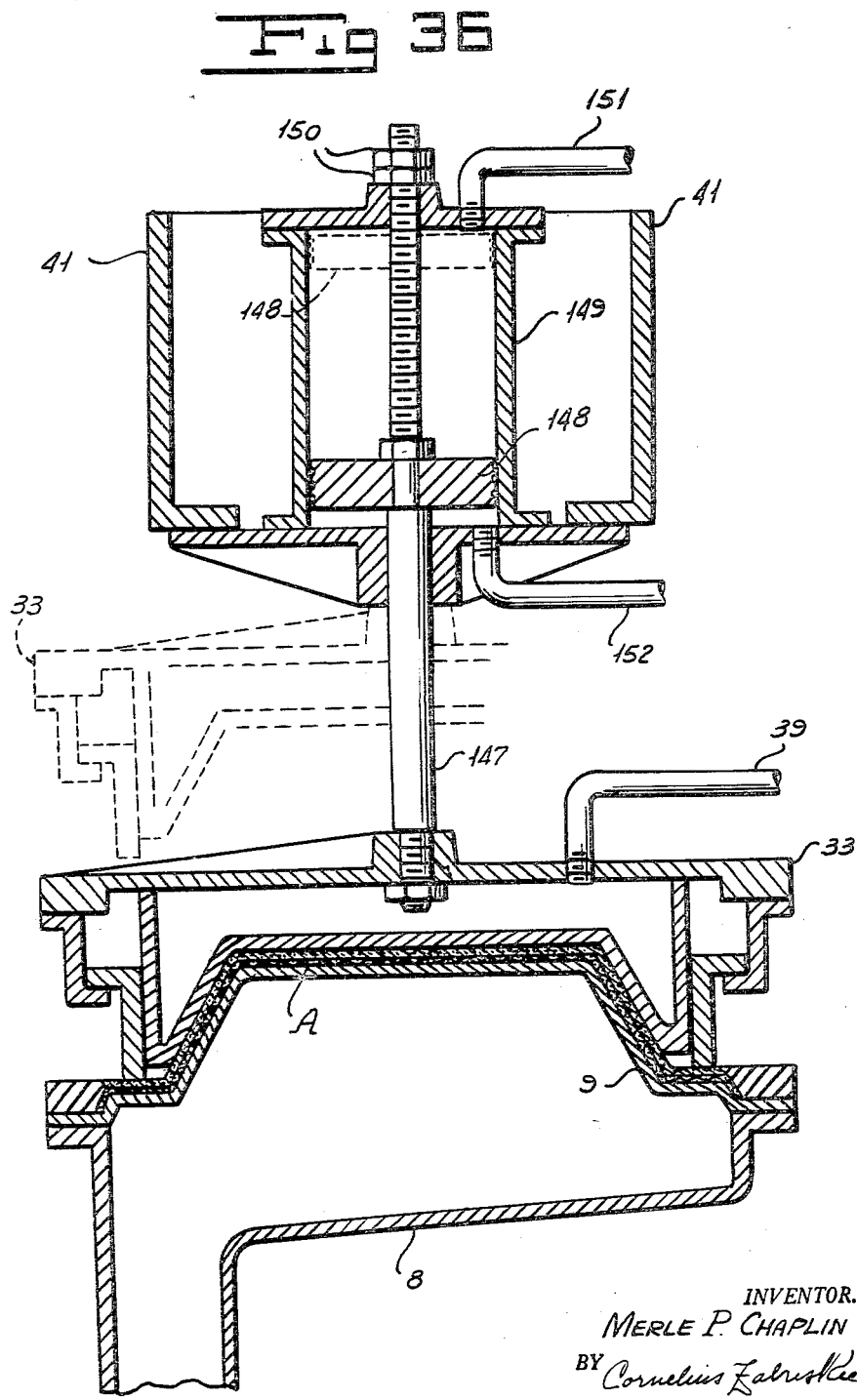

United States Patent Office 2,938,582
Patented May 31, 1960

2,938,582

APPARATUS FOR MAKING MOLDED PULP ARTICLES

Merle P. Chaplin, South Portland, Maine, assignor, by mesne assignments, to Diamond National Corporation, New York, N.Y., a corporation of Delaware Filed Sept. 29, 1953, Ser. No. 382,985

25 Claims. (Cl. 162—392)

This invention relates to apparatus useful in the manufacture of molded pulp and fibre articles. It deals with the production of such articles from the liquid pulp fibre stage to the finished dry end product, with various steps or stages of intermediate treatment.

The apparatus herein set forth is applicable to the manufacture of molded open-faced articles for all purposes and uses. Some of these articles comprise plates, dishes and trays for the packaging and delivery of foods and food products. Others include packing flats and cartons for eggs and fruits which may be kept in storage for different time periods. They are particularly adapted to produce containers and packages of various kinds for so-called durable goods, such as hardware, light bulbs, automobile and airplane parts and assemblies, and products of a similar nature where a strong but yielding type of packing material is necessary to insure safe delivery of articles and materials of these kinds.

The primary object of this invention is to provide novel apparatus for producing molded pulp and fibre products of marked strength and serviceability, from a wide variety of fibrous and similar materials and with varying kinds of treatment during their progress through the various mechanisms of the apparatus.

Another object of this invention is to provide mechanism for reinforcing certain sections of articles where extra strength is necessary or desirable.

Another object of this invention is to provide a novel mechanism for consolidating the fibrous materials into a compact, strong, homogeneous structure immediately after the fibrous materials have been transformed from a liquid to a semi-solid state or condition.

Another object of the invention is to provide novel mechanism for removing an article from a constantly moving die on which it was formed, by means of a transfer die, while still providing a rest or stationary period during which time the transfer die and article thereon are held in a fixed position to permit certain operations to be performed on certain portions or areas of the article while so held.

Another object of this invention is the provision of mechanism, associated with a transfer die, cooperating with mechanism associated with a take-off die, for re-shaping certain portions of the article, and after such treatment for retaining the article on said take-off die, and of subsequently delivering the treated article to a constantly moving conveyor.

Another object of this invention is to provide mechanism for delivering the freshly formed articles to one or more conveyors for further treatment, such as dehydration and conditioning with or without subsequent refinishing.

Another object of this invention is to provide means whereby the moisture or forming water, remaining in the article after forming and other treatment, is removed rapidly and efficiently during a certain stage of its passage through a dehydrating mechanism and the article subsequently conditioned to eliminate unevenness in remaining moisture content and to relieve strains or stresses which may have been set up in the article during previous rapid removal of moisture therefrom.

Another object of this invention is to provide apparatus for conditioning the surface of the article during the final stage of moisture removal whereby said surface conditions lend themselves to a refinishing operation for improving of surface finish and appearance of the article.

The foregoing and other novel and desirable objects and features are more fully hereinafter disclosed, and their inter-relationship in the complete integrated apparatus.

To secure strong, durable molded fibre articles through suction molding procedures, it is necessary to start with a very dilute mixture of fibres and water or other liquid medium, usually with as little as one part of fibre to two hundred parts of water. The finished molded fibre article has a ratio of more than nine parts of fibre to one part of water or moisture remaining in the article when it is in its best condition for use.

It will therefore be seen that the production of superior types of articles necessary for the packaging of widely different kinds and types of products or merchandise, requires, among other things, the removal of large quantities of water or other liquid during the several stages of its manufacture. For efficient operation, this must be done rapidly, yet under conditions which enhance rather than detract from the utility and appearance of the finished article. The widely different uses of the molded articles produced by the apparatus of this invention require that it be extremely flexible in its methods of production, and that each phase be completely integrated with associated phases, operations, or steps, yet providing the necessary novel features so that the varying requirements of article quality may be met.

The completely integrated operation of the apparatus of this invention is generally as follows:

Liquid fibre mixture is introduced into a tank and maintained under constant circulation and agitation so that there will be a uniform dispersion or mixture of fibres and liquid at all times. A suction die on which the article is to be formed is caused to travel through this mixture, while vacuum or suction is applied through the die surface. This draws the liquid of the fibre mixture through a wire screen covering the die surface and the perforations in the die, leaving on the surface of the screen a deposit of fibres still containing a very substantial amount of water or other forming liquid. Under certain conditions, said screen covering is dispensed with, and the openings or perforations through the die made sufficiently small so that little or no fibre passes through them, the deposit of fibre being built up directly on the die surface. After emergence from the liquid fibre mixture in the tank, vacuum or suction is continued through the die and this draws the fibre mixture tightly against the die surface or wire screen covering the die surface, compacting or solidifying the fibrous mat. After a certain period, the freshly formed article is sufficiently rigid and durable so that it may thereafter be handled by a series of dies accurately fitting the article surface, as is hereinafter described.

When some fibres and/or other materials are employed or treated in certain ways, the freshly formed mat solidifies rapidly and sufficiently by the application of vacuum or suction alone. However, in other cases, solidification is not as complete as desirable. There remains in the article, excess liquid and air bubbles and open spaces between the fibres, which delay the subsequent removal of such excess liquid and decrease the strength of the article. When such a condition exists, it is desirable to compress or solidify the article mat by subjecting it to the action of a solidification die immediately upon emergence of the mat from the fibre mixture in the tank, thereby eliminating the voids and spaces which contribute nothing to article strength and detract from both appearance and utility.

After the article is compacted or solidified by either or both suction and a solidification die, it is carried by the forming die into cooperation with a transfer die which removes it from the forming die while both dies continue to travel.

When the article is removed from the forming die by the transfer die, it is of the utmost importance that it be removed evenly and the fibre structure, produced on the forming die, either under the control of suction alone or suction plus supplementary mechanically applied solidifying pressure, be not disturbed. Consequently, the transfer die must fit the article accurately and completely over its entire exposed surface during such removal. Similarly, subsequent coaction between the transfer die and a take-off die, must be equally accurate for, during this latter operation, the article edge or other portions are preferably reinforced by thickening or folding the fibre structure over on itself.

If the main body of the article is disturbed during the transfer operation or at any time before it reaches the mechanism designed to remove the remaining excess water from the article, strains will have been set up in any part of the article which has been deformed. These strains will result in a preliminary distortion or change of article shape, which the final conditioning mechanism, which I employ, may not be able to thoroughly eradicate.

There are cases, however, where a deliberate distortion or displacement of a portion of the fibre structure of some part or parts of certain articles serves a useful and necessary purpose in the utility of the finished product. This can be accomplished in various ways, one phase or operation being augmented or supplemented by another at a later stage in the integrated operation. For instance, the article, immediately after leaving the liquid fibre mixture, may be compacted unevenly over different areas by the solidification die. These same unevenly compacted areas or portions or other areas or portions of the article may be further treated, and in most cases must be further treated by a transfer and a take-off die having corresponding spaced and constituted areas in their article contacting surfaces. Certain portions of the article may be thereby rendered more suitable for cushioning purposes by a deliberate separation or pulling apart of the interlocked fibre structure which was initially built up primarily for strength while the article was being formed from the very dilute fibre mixture.

After the article has been brought to its final shape and form, the last of the excess water of formation may be removed. This I may accomplish by dehydration and conditioning steps, during which the molded article is successively passed through suitable chambers by means of conveyors. For supplying necessary temperature for the dehydration step, I prefer to utilize superheated steam with the exclusion of air, as such, so far as is practicable, from the dehydrating mechanism.

When water vapor or steam has been heated above its vaporization point, it acquires much more moisture carrying capacity per unit of volume than does dry air heated to the same temperature. Superheated steam is extremely active in absorbing any water or water vapor which it can reach or contact, and will continue to seek and hold this water vapor as superheated steam so long as a temperature substantially above the point of condensation prevails. This temperature is maintained through rapid circulation of the superheated steam by means of fans or blowers, said steam being reheated and recirculated over and by the molded products during this process of dehydration.

It has been found that steam at several hundred degrees of temperature above the condensation point of water may be utilized without detrimental effects on the articles subjected to the dehydration step. On the other hand, if hot air is used at any such temperatures, serious surface phenomena take place which deteriorate, distort and frequently case-harden the surface fibres of the fibrous mass, injure their quality and seriously retard further removal of moisture or vapor or moisture vapor from the surfaces or areas below the case-hardened surface.

When both dehydration and conditioning chambers are employed in succession, the temperature in each may be increased or reduced to meet certain specific conditions. For instance, the dehydration process, carried out in the dehydration chamber, may remove most of the water of formation remaining in the product, while the conditioning chamber is utilized largely for normalizing purposes. In this case the temperature in the conditioning chamber may be only slightly above the condensation point of water or other liquid medium employed which reduces the capacity of the circulating medium to remove additional liquid or vapor from the article. It will, however, absorb vapor from areas where there is a greater supply than is normal or where dehydration in the dehydration chamber has not proceeded to as great a degree as over some other portion of the article. These areas will continue to give up their water vapor and sufficient temperature is maintained in the surrounding vapor in the chamber to absorb the water vapor thus escaping from the article. Other areas or portions of the article which have been adequately dehydrated in the dehydrating chamber, will give up little additional moisture or vapor, and where the conditions in the conditioning chamber approach the point of liquid condensation, this conditioning may actually restore some vapor or moisture to the article at any point from which a greater amount than is desirable or necessary may have previously been removed.

The retention of the article in the conditioning chamber for even a short period of time has an effect on the article which may be likened to the normalizing or heat-treating of metals and other similar materials. Strains which may have been set up by the rapid withdrawal of vapor during the high temperature dehydration period are removed and the finished product will be more stable, strong and useful than without such normalizing treatment.

Where it is desirable or necessary to refinish the whole or any portion of the surface of the article, subsequent to the dehydration and conditioning steps, the timing is so arranged that the article enters the conditioning chamber while still giving up substantial quantities of moisture in the form of vapor due to the heat generated within the article itself while passing through the dehydration step. The removal of this moisture which is being expelled by internal heat from the body of the article is arrested in the conditioning chamber by a sudden drop in the temperature of the surrounding medium which has less ability to absorb or carry away this vapor as it leaves the article. The interior of the body of the article may still remain at a relatively high temperature and thus exude moisture vapor to the surfaces thereof, but the lower temperature in the conditioning chamber will tend to produce a condensing effect with the result that, in the surface strata of the article, the moisture may, in some cases, return to liquid form.

Upon leaving the conditioning chamber, the article is immediately positioned between heated refinishing dies, which press down the surface fibres in their moistened, steamy and soft condition, and hold these surface fibres in intimate contact with those immediately below, whereby, as the heat of the refinishing dies finally sets the fibrous structure of the article, these surface fibres are consolidated into the remainder of the article to produce smooth surfaces with resulting characteristic finish, hardness and outstanding utility.

During this operation, residual moisture is permitted to escape, in the form of steam, from at least one surface of the article, or portions of one surface, so that the article finally leaves the refinishing mechanism ready for commercial use.

It will thus be apparent that, beyond the dehydration chamber, my invention may be practiced according to two different optional methods, each directed to a specific objective.

According to the first optional method, the conditions in the conditioning chamber are so adjusted or regulated that the article is delivered therefrom divested of excess water and in condition for commercial use.

The second optional method is employed where it is desired to have a better surface finish or appearance on the article than is usually obtained by the operation of the dehydrating and conditioning chambers alone. To this end, the conditions in the conditioning chamber are so adjusted and regulated that the article leaves this chamber while still containing or retaining, upon or near its surfaces, some excess of the water used in its initial formation. It has not been dried. It has not been case-hardened at its surfaces. The fibres in its surface strata are soft and pliable and in the best possible condition to be acted upon by refinishing dies which then produce the smooth consolidated surfaces, to which I have referred, and simultaneously dry the article to prepare it for immediate commercial use.

Undesirable deformation in shape and size of molded products during their production on automatic machinery has long been a problem of considerable magnitude. Articles which have been completely air-dried by many if not all prior methods, warp, twist and otherwise change their shape to a greater or lesser degree during such air-drying processes. Many of these articles are wholly unmarketable and have to be rejected, thereby reducing machine manufacturing capacity and increasing production cost. Some such misshapen articles have been reclaimed by various types of straightening and reshaping processes. In some instances such articles have been put through some sort of reshaping or pressing stage, such as stacking them for lengthy periods of time under pressure in presses or racks, or pressing them with high pressure dies in groups or stacks. In other cases each individual article has been pressed to bring it back to correct shape and size. All of these expedients to correct misshapen, previously dried, molded products are expensive and inefficient. Many require considerable labor in moving the products from process to process, or of storing them for periods of time to enable the repressing operation to be effective to any appreciable degree.

When articles are prepared for the market, according to either optional method of this invention, air is preferably excluded, insofar as practically possible, from both the dehydrating and conditioning chambers, so that the ill effects thereof may be eliminated. I have found that, through the use of steam in the manner described, there is little, if any, warping or distortion evident in the finished articles produced by either of my optional methods.

Moreover, when a molded pulp article is air-dried, the entire surface of the article is covered by interspaced wood fibres which stand up and away from the surface of the article in a set and hardened condition, so that, no matter how much pressure is thereafter placed upon them either by cold or heated dies, it is impossible without intermediate and extra treatment to permanently lay them flat and thereby produce a permanently smooth surface. Although they may be temporarily forced into a flattened condition by the dies, many of them will invariably spring back into upstanding position either immediately or after a short period of time.

In contradistinction, the articles, according to my invention, follow a completely integrated procedure and, where a smooth permanent surface finish is desirable or necessary, they are properly prepared in the dehydrating and conditioning mechanism in the presence of superheated steam from which air has been excluded as far as is commercially practicable so that the surface condition and the surface fibres are still in a soft unset condition and, when acted upon between heated dies, the surface fibres are laid flat against the underlying fibrous body and are permanently consolidated and bonded thereto with a perfectly smooth surface finish.

In order to prevent air from entering the dehydrating and/or conditioning chamber at any point where the articles are being introduced or removed, or where the conveyor enters and leaves the evaporating housing, specially constructed air locks are provided at all of these openings. These prevent any air from entering, but still enable the liquid, which has been removed from the articles during the dehydration process in the form of vapor, to be taken away and discharged outside of the dryer housing and, where desirable, outside of the building enclosing this housing.

The accompanying drawings illustrate different practical embodiments of this invention. However, these showings are simply illustrative and are not to be taken in any way as defining the limits of this invention.

Figure 5:
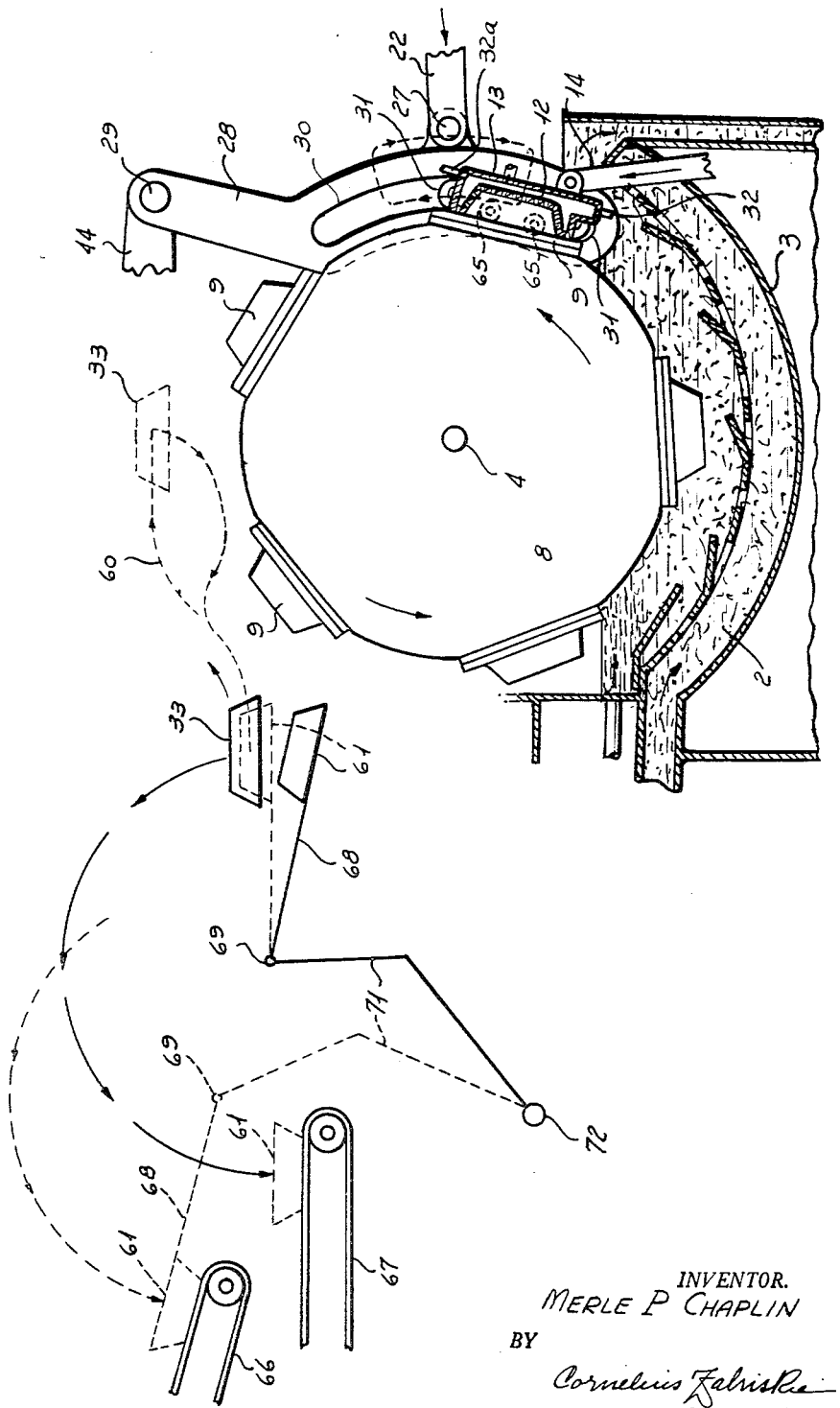

Fig. 5 is a diagrammatic view, showing the relationship between the forming mechanism, the mechanism for solidifying the fibre structure while still on the forming die, the path or movement of the transfer die which removes the article from the forming dies, and the path of the take-off dies in removing the articles from the transfer dies and placing them on one of two conveyors of the dehydrating mechanism.

Figure 6:
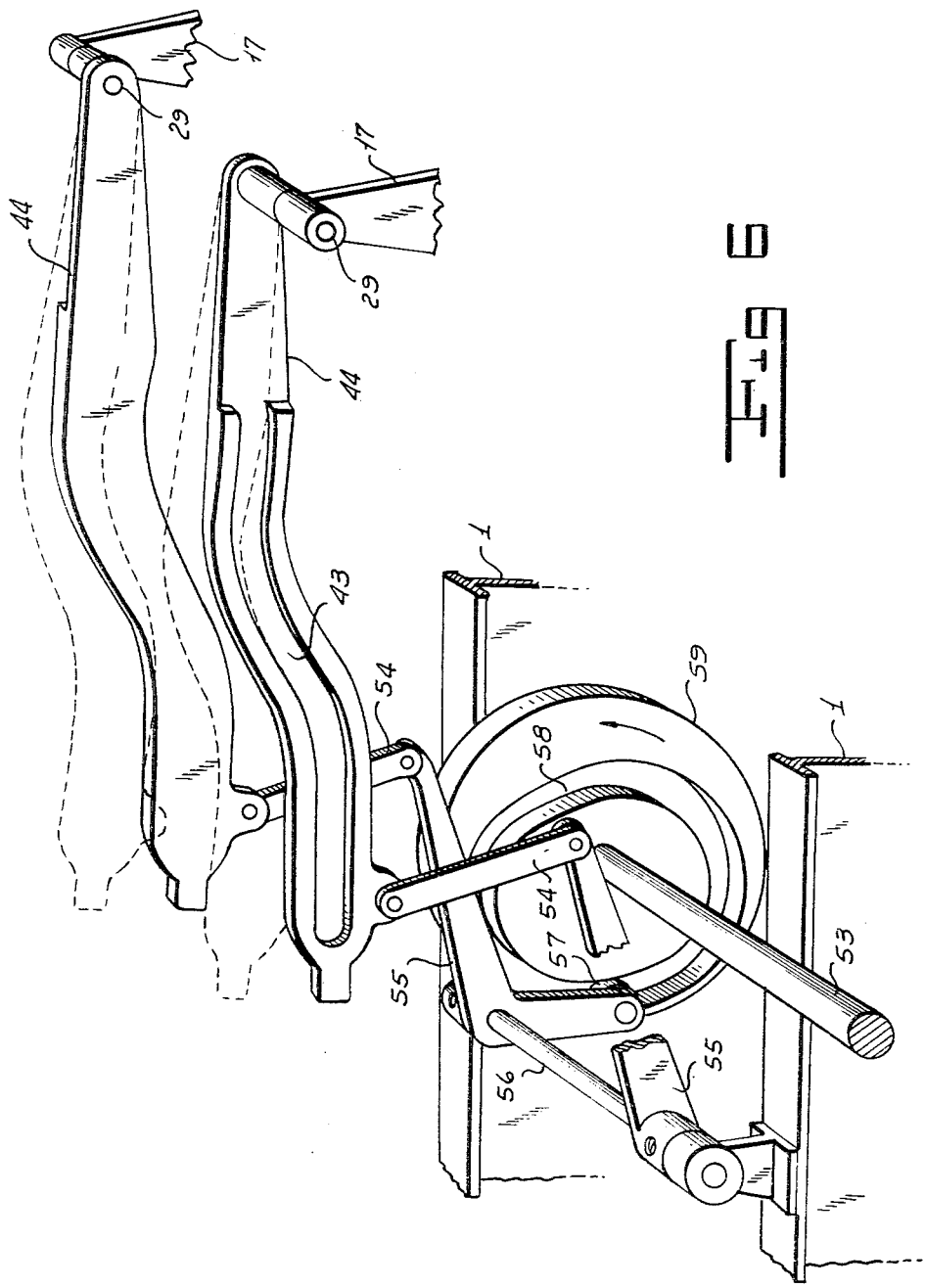

Fig. 6 is a fragmental perspective view showing the mechanism which supports the transfer dies during their travel, together with means for moving the transfer dies to coact with the forming dies for an appreciable portion of angular movement of said forming dies.

Fig. 7 is a view similar to Fig. 6, but illustrating the mechanism for reciprocating the transfer die longitudinally of the apparatus.

Fig. 8 is a fragmental perspective view of the mechanism for controlling the operations of take-off dies which receive articles from the transfer dies and deliver them to conveyors of the dehydrating mechanism, a portion of which is shown in this figure.

Figure 1:
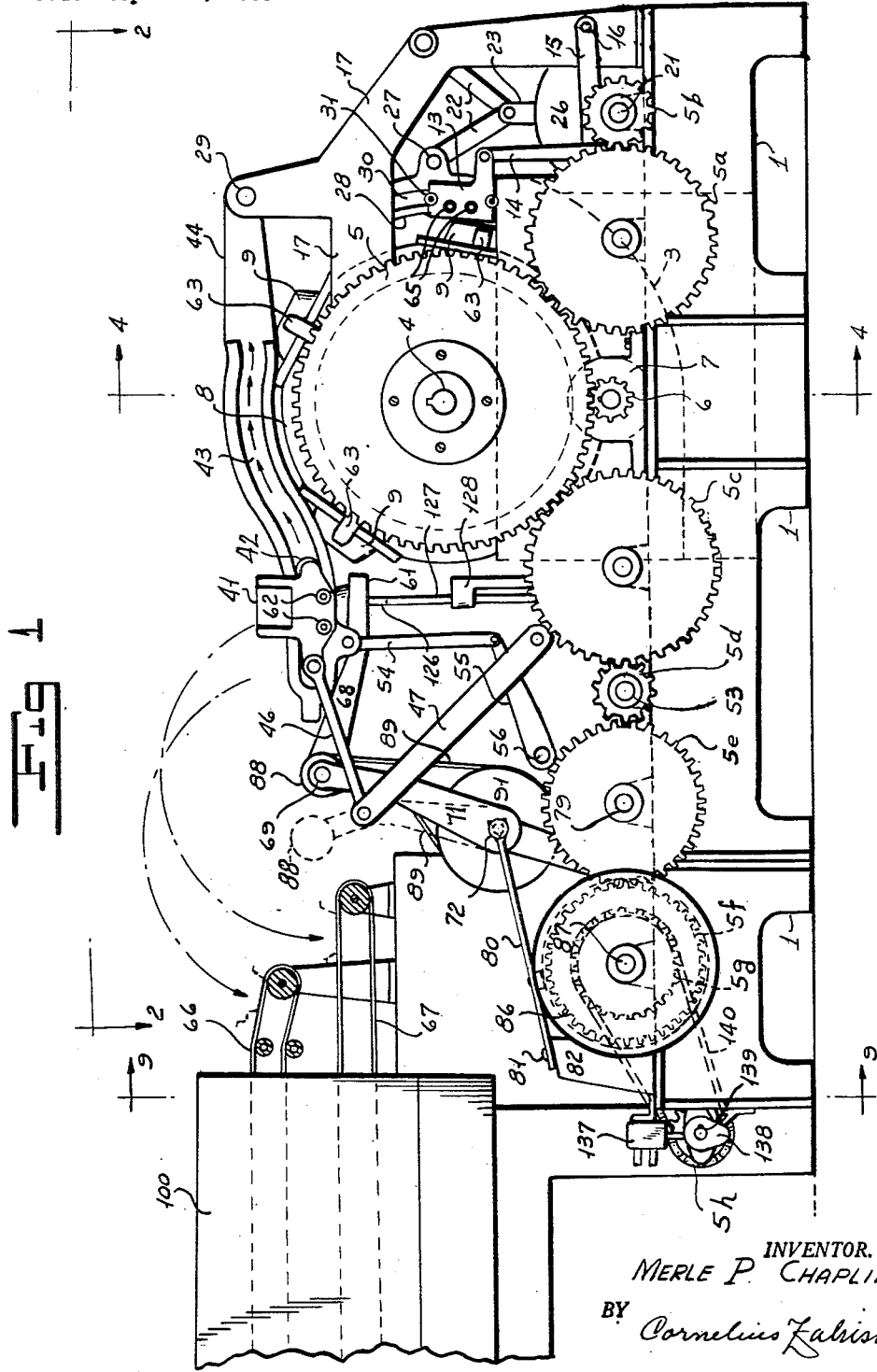
Fig. 1 is a side elevation of apparatus according to the invention, with only part of the dehydrating mechanism illustrated.

Fig. 9 is a transverse section taken on approximately the plane of the line 9—9 in Fig. 1, with the dehydrating mechanism removed and with certain parts broken away in the interest of clearness.

Fig. 10 is a fragmental perspective, showing mechanism for operating the preliminary solidifying mechanism relative to the forming dies as the latter continuously rotate.

Figs. 11–18 are schematic showings of the progressive steps in the operation of the transfer dies, in first engaging with articles on the forming dies, removing the articles therefrom, holding the articles in coaction with the take-off dies for article treatment, delivery of the article from the transfer dies to the take-off dies, and finally the delivery of the articles from the take-off dies to a two-level conveyor.

Figs. 19 to 21 are fragmental sections through the preferred form of forming and transfer dies, showing the manner in which they cooperate to take an article from the forming dies as shown in Fig. 19 and place it on transfer dies as shown in Figs. 20 and 21.

Figs. 22 and 23 show successive operations between transfer dies and take-off dies, these figures being fragmental sections and showing different steps in the operation.

Figs. 24 and 25 are fragmental sections through articles having certain portions thereof reshaped by the mechanism shown in Figs. 22 and 23.

Figs. 26 and 27 show modified forms of the mechanisms shown in Figs. 22 and 23 for performing a different treatment of a part of the article and a different form of edge structure.

Fig. 28 is a fragmental view showing a take-off die, of the kind shown in Figs. 26 and 27, depositing an article on one of the conveyors of the dehydrating mechanism.

Fig. 29 is a diagrammatic longitudinal section of the dehydrating and conditioning mechanism together with the refinishing dies to which the articles may be delivered for further treatment.

Fig. 30 is a transverse section on the line 30—30 of Fig. 29.

Fig. 31 is a fragmental section on line 31—31 of Fig. 30.

Figs. 32-35 are fragmental sections showing the manner in which one or more portions of an article may be provided with softened or cushioned areas, through the cooperation of the forming and preliminary solidification dies shown in these figures.

Fig. 36 is a vertical section through the transfer die carrier, showing the preferred manner of supporting a transfer die thereon to permit said die to be retracted from its normally active position on the carrier, at such times as this is desirable.

The first operation of the completely integrated process employing the method and mechanism of this invention, is the formation of a shaped layer or sheet of pulp or fibre material on a foraminous die by means of vacuum or suction.

The mechanism which forms the articles from this liquid pulp or fibre mixture is illustrated generally in Figs. 1, 2, 3, 4 and 10. Mounted on a suitable base 1 for rotation on a generally horizontal axis above the fibre mixture in tank 3 is a shaft 4 driven by a gear 5 from a pinion 6, powered by any suitable means such as a motor 7. Mounted on the shaft 4 is a forming drum 8 about the periphery of which are mounted forming dies 9, these being arranged in any suitable manner for the formation of articles of various kinds and types. Any suitable number or sets of these dies may be employed, but, for purposes of illustration, I here show five sets or pairs of dies, arranged about the drum periphery, each set being equally circumferentially spaced from the other. In the interest of terse description, each set or pair of these forming dies will hereinafter be referred to as a single "die," which shall be understood to designate any desired number of each set. This same course will be followed in connection with sets of solidification, transfer and takeoff dies which subsequently coact with the articles. Rotation of the drum carrying these dies causes them to pass through the fibre mixture 2, supplied to and circulated through the tank 3, as presently described, and a fibrous layer is accreted on each forming die so submerged, to form an article A thereon.

The pulp or fibre material, in very dilute form, mixed with water or other liquid, is prepared by various methods and means well known in the art. This dilute mixture, in proper relation of fibres and liquid is introduced into tank 3. The level of liquid-fibre mixture in this tank is maintained reasonably constant at approximately the level indicated in Fig. 5.

The formation of articles on the surface of the dies 9 is performed by the application of suction to the interior of each die, and for such purpose, the interior of the drum is provided with drainage ducts 10 associated with each die, these suction connections 10 leading to suitable vacuum pumps or other supply mechanism at proper times to accrete a layer of fibre on the die 9 by suction forming methods well known in the art. Similarly, compressed air is communicated through pipe 10a to these suction passages 10 at the rear of the die 9, to facilitate the removal of the articles formed thereon by methods and means also well known in the art.

Figure 4:
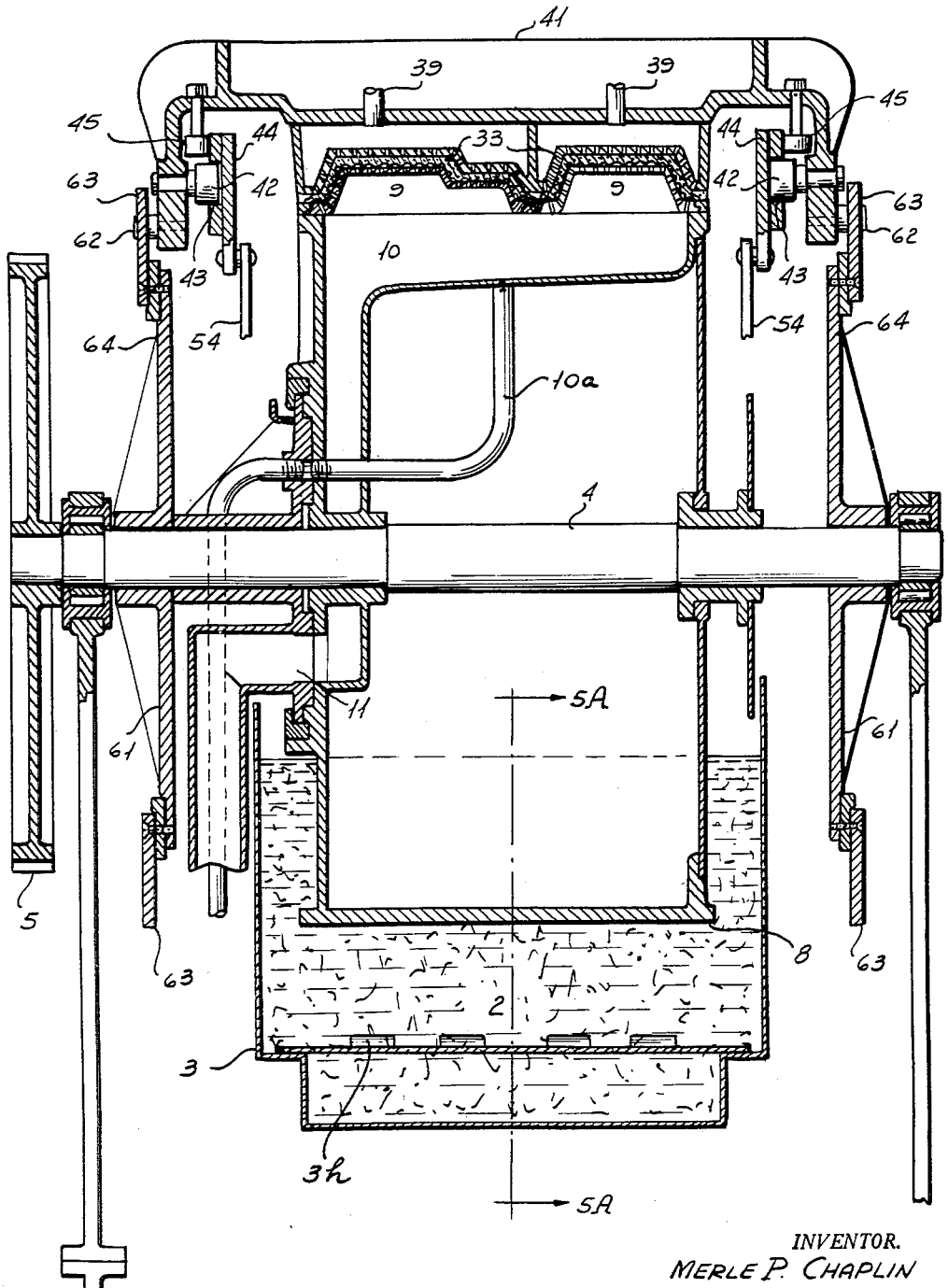
Fig. 4 is a transverse section on line 4—4 of Fig. 1.

In Fig. 4 of the drawings, a conventional valve or port box 11 is shown on one side or end of the drum 8, although similar valves or port boxes may be provided on both ends where and if desired. The communication of suction for the removal of the water drawn through the die perforations while the article is being formed, as well as pressure applied through the rear of the die for the removal of the article therefrom, is so well known in the art that a detailed description is not considered necessary.

Figure 2:
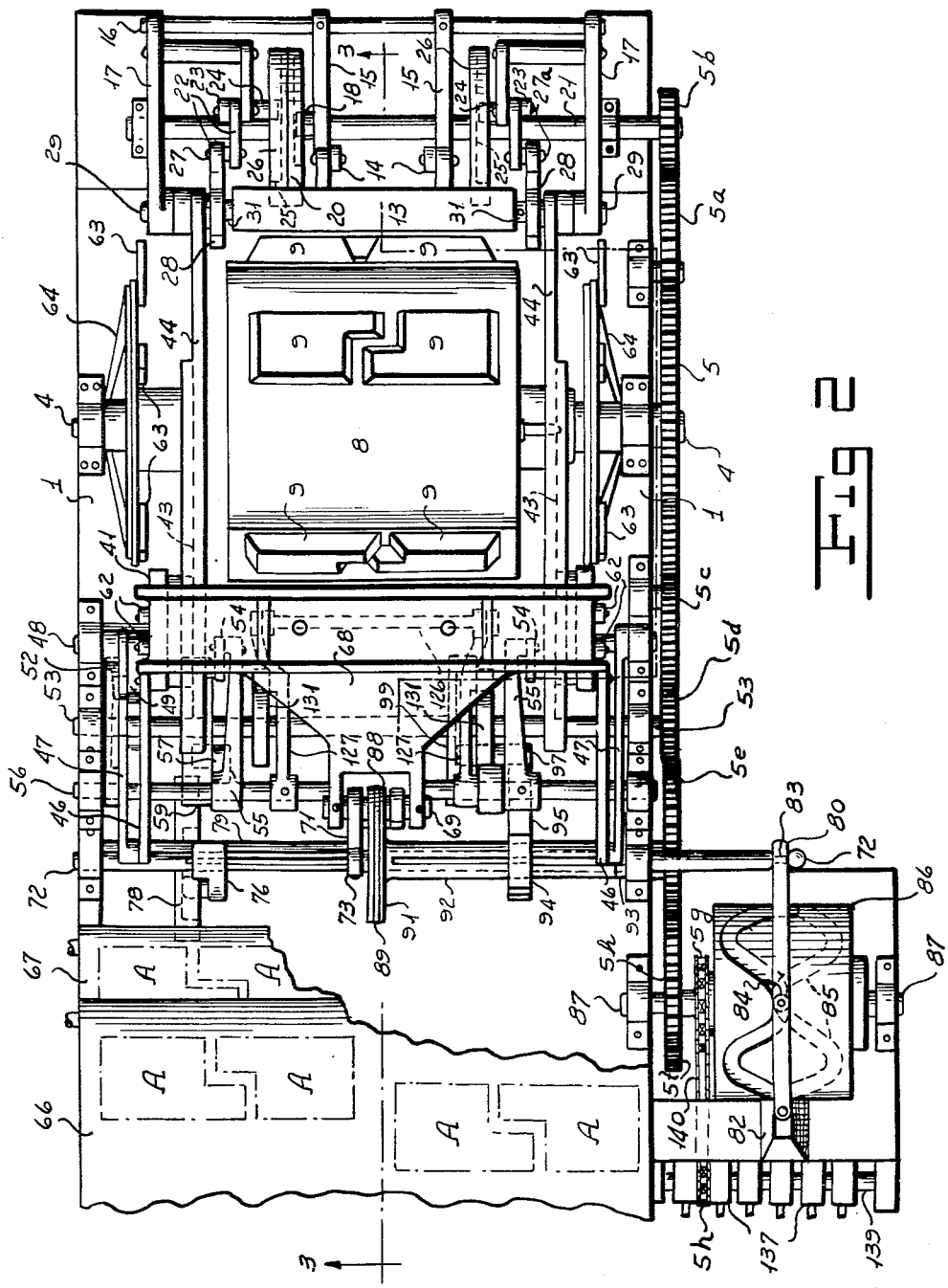
Fig. 2 is a plan view of Fig. 1.

After an article has been suction formed on one of the dies 9, as stated, continued rotation of the drum carries the article out of and beyond the tank 3. Since suction is continued through the die, an even solidification is obtained over the entire article surface due to atmospheric air pressure against the exposed surface thereof. With some pulps this is sufficient to permit subsequent removal of the article from this die without damage to said article. With other materials, however, it is desirable to solidify the article mat quickly by mechanical pressure, either over the entire surface of the article, or over selected areas as may be desirable or necessary. To accomplish this result, a pair of solidification dies, hereinafter referred to as die 12, are provided as shown in Figs. 2 and 10. Die 12 is mounted on any suitable carrier, such as a U-shaped hollow mounting member 13 and is provided with perforations or holes through its surface which contacts the article, with a chamber 12a in the rear of this die, the purpose of which will be hereinafter explained.

Figure 3:
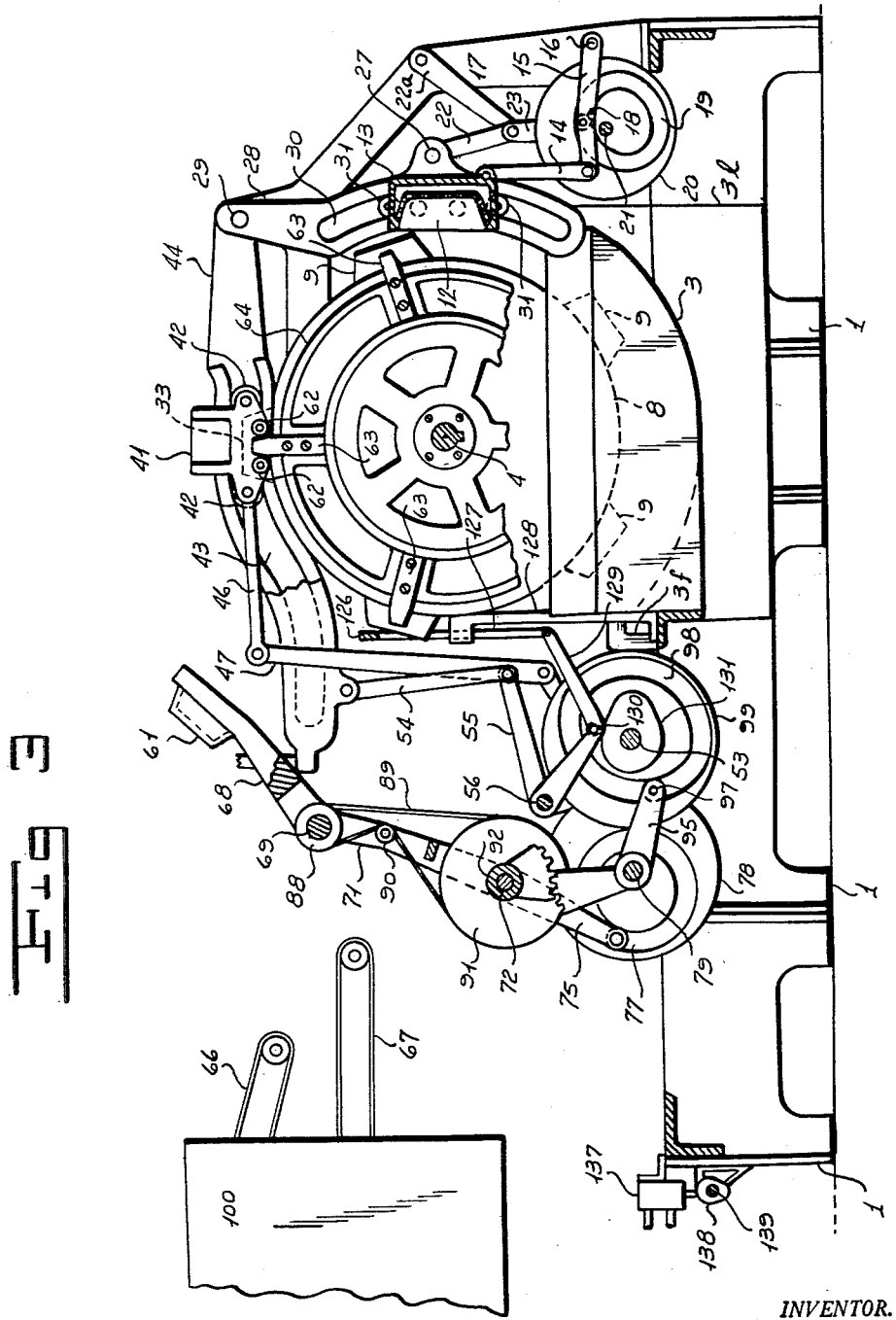
Fig. 3 is a side elevation of the apparatus with certain parts broken away and other parts in section on the line 3—3 of Fig. 2.

The carrier 13 is mounted on a pair of links 14 (Fig. 10). The upper ends of these links are pivoted to the carrier by pins 14a, while their lower ends are pivoted to the ends of levers 15. The opposite ends of these levers 15 are fixed to a transverse shaft 16 pivotal in upstanding standards 17 at each side of the apparatus and rigid with the base 1. One lever 15 carries, intermediate its ends, a cam follower 18 projecting into a cam track 19 in a cam 20 (Figs. 3 and 10). The cam 20 is fixed on a shaft 21 carrying at its outboard end a gear 5b connected to the gear 5 through an idler 5a (Figs. 1 and 2). This gearing causes the shaft 21 to make one complete revolution for each passage or movement of the forming die past the solidification die. In other words, the cam shaft makes five complete revolutions for each revolution of the forming unit shaft 4.

Movement of the carrier 13 toward and away from the forming dies is accomplished by two toggles 22. To the elbow of each toggle is attached a link 23 carrying a cam follower 24, operable in a cam track 25 formed in a cam 26 (Fig. 10). The cams 26 of both links are fixed to the shaft 21 and one is positioned back to back with the cam 20 (Figs. 2 and 10). One terminal of each toggle is secured to a pivot rigid with the adjacent standard 17, while the other terminal of such toggle is secured by a pivot 27 to a hanging arm 28, supported at its upper end on a pivot 29 also carried by and rigid with the standard 17. The hanging arms 28 are provided therein with arcuate slots forming cam tracks 30 to receive roll trunnions 31 on the corresponding ends of the carrier 13.

With this arrangement, the carrier 13 is mounted to travel with the individual forming dies with the solidification die 12 engaged therewith, and during an appreciable portion of the annular movement of such forming dies, to compress and solidify the pulp articles on said forming dies. The pivotal mounting of the carrier on the links 14 permits of tilting of the carrier 13 to retain parallelism between the die surfaces of the forming dies 9 and solidification dies 12, while the shaping of the slots 30 accurately controls such tilting movement, and the toggles apply the necessary force to the pressing carrier to effect the pressing operation.

The cam tracks of the cams 20 and 26 are so shaped that the solidification die 12 is engaged with the article on each forming die 9 shortly after it leaves the tank. While thus engaged with the article, it travels along therewith for a distance to compact and solidify said article and it is then withdrawn from the article, as shown in Fig. 10, and lowered, to be next engaged with the article on the next following die to repeat its cycle of operations with respect to this latter die.

To insure proper registration between the forming and solidification dies while co-acting with one another, the carrier 13 of the latter die is provided at its opposite ends with spaced apart indexing rolls 65 (Figs. 1 and 5) adapted to receive between them indexing fingers 63 having fixed relation to and rotatable with the forming drum, as hereinafter described.

During the period of co-action between the solidification die 12 and the freshly formed articles on forming dies 9, it is possible, when certain pulp or fibre materials are used, to express a considerable amount of water from the article, eliminate air bubbles and voids between the fibres making up the article, and thereby render the finished product more serviceable. During such co-active relationship, and while pressure is being applied on the freshly formed article for a considerable period of time, vacuum is maintained through the forming dies to draw away and remove any water which may be expressed from the articles thereon during this solidification operation; also, vacuum may be applied through a pipe 32 located in a pocket in the bottom of the die carrier 13, as shown in Fig. 10, so that any water or air which may be freed from the articles during the solidification step may be removed from the articles and die by a combination of vacuum and gravity. A pocket in the bottom of the die carrier accumulates any sudden rush of water which may be expressed from the articles and permits it to be drawn off by pipe 32 without any danger of its being blown back through the perforations in the die 12 when the dies are separated.

To prevent any possibility of the articles being detached from the forming dies 9 when the solidification die 12 is withdrawn, compressed air may be introduced through the top of the die carrier 13 via pipe 32a for a brief instant to insure that no part of any article is retained on the surfaces of die 12 when said dies are withdrawn.

In addition to solidifying the articles on the forming dies, the solidification die may also provide for different treatments of different areas or portions of the freshly formed article for special and useful purposes. The surface shape of the solidification die 12 may conform exactly to the shape of the solidified article on the corresponding die 9 where it is desired to solidify and densify the entire structure of the finished product. However, certain portions of such die 12, may provide greater spacing or clearance between them and the die 9 over any areas of the article which it is desired to leave uncompressed or unsolidified or where it is desired to deliberately disrupt or rearrange the wet fibre structure for the purpose of providing cushioning or other types of areas or portions in the article being produced. This may be accomplished in the manner next described, reference being had to Figs. 32–35 of the drawings.

Fig. 32 shows, considerably enlarged, a fragmental section of a forming die 9 with the customary openings 201 through the die face to the rear of the die through which suction or vacuum is applied, and a die covering 202 of fine mesh wire. Shown on this die in Fig. 32 is an accreted fibre deposit A of whatever thickness may be desired or may be necessary for the production of a finished product for any specific purpose.

A similarly enlarged section of the cooperating solidification die 12 is shown in Fig. 33. In this case, there is provided a pocket or a series of pockets or cavities 203, as may be desired, in the face of this die, through which there are communicating passages or openings 204.

The cooperation of the forming die 9 and the solidification die 12 is shown also by an enlarged section, in Fig. 34. Here the vacuum or suction applied through opening 204 of the solidification die 12 is greater than the suction or vacuum through openings 201 of die 9. Therefore, it follows that the fibre deposit, still in a soft and pliable state, will be drawn away from the wire screen 202 covering the surface of die 9, into the recess or pocket 203 of the solidification die 12. When the solidification die is removed from its contact with the article on the forming die, the article will appear as illustrated in Fig. 35. The wet pliable fibres, which have been stretched out of their initial interfelted and interlocked condition by drawing them into the shape shown in Fig. 34, will not and do not return to their original interlocked state, but are left in a soft loose condition indicated at 205, Fig. 35. It is possible in this way to make many and varied modifications of the surface shape of the solidification die for accomplishing different purposes and providing different types and placement of surfaces, cushioned areas, etc., on the finished product.

It should be understood, however, that, when cushioned portions or areas are to be formed in an article, all those dies which contact with said article after it leaves the solidification and forming dies, should be so constituted that their areas which correspond to the cushioning areas of the article will maintain the latter areas, throughout the subsequent operations, to insure their presence in the end product.

It is not always necessary or desirable to use the solidification step previously described. Where it is not desired, the cam shaft 21 is disconnected in any suitable manner from the driving mechanism, with the dies 12 left in withdrawn position so that they will not interfere with the movement of or coact with the forming dies 9 during rotation of the latter about the shaft 4. Cam shaft 21 may be easily and quickly reconnected to the driving mechanism at any time when it is desired to place the solidification mechanism in operation.

After an article on a forming die 9, has been either adequately solidified by the application of vacuum on the inside of the said die and air pressure on the outside, or by the operation of a solidification die as stated, its continued travel brings it at or near the top center over the forming shaft 4. At this point, it is engaged by a transfer die 33, to be subsequently removed by the latter die, this removal being accomplished by shutting off the vacuum behind the forming die 9 and applying compressed air through the forming die 9, to eject the article therefrom while vacuum is applied to die 33 to retain the articles on the latter.

As shown in Figs. 1, 2, 3, 4, 5, 6, and 7, the transfer die 33 is supported by a carrier 41 having rolls 42 guided through a path defined by two cam tracks 43. These cam tracks are mounted on a pair of levers 44 pivoted at 29 to the bracket 17 of the frame 1. These levers are pivotally moved in unison toward and away from the forming mechanism and forming die 9 by means of links 54, levers 55, on shaft 56, cam roll 57, cam track 58 in cam 59, this cam being mounted on and rotated by a cam shaft 53. This movement of the cam tracks 43 is generally up and down above pivot 29, as illustrated diagrammatically in Fig. 6.

To provide for rectilinear motion of the transfer die carrier 41 along cam tracks 43 guided by cam rolls 42, a second cam 52 is also mounted on cam shaft 53 and rotated therewith, cam track 51 in cam 52 operating a cam roll 50 which in turn oscillates lever 49, shaft 48, and two levers 47 which, by means of connecting links 46, connect the levers 47 to the carrier 41 to enable this carrier 41 to be moved the entire length of the cam tracks 43. This particular mechanism is illustrated in Fig. 7.

Figs. 11 to 18 inclusive show the relative positions and co-active relationships between a transfer die 33 and a forming die 9, this co-action and interrelationship being generally as follows:

Fig. 11 shows the forming die 9, moving in the direction of arrow, with the transfer die 33 mounted on its carrier 41 located in a position generally directly above the die 9 which is continuously moving in the direction of arrow. When the carrier 41 with its transfer die 33 reaches a proper position in relationship to the continually moving die 9, the cam tracks 43 are moved downward by means of levers 55 and mechanism already described, while at the same time the carrier 41 is moved in the direction of the arrow at a speed identical with the speed of the forming die 9 and in the same direction. Continued downward movement of the cam tracks 43 brings the transfer die into alignment with the forming die, as shown in Fig. 12, but not yet in contact with the article on the forming die.

Further continued motion of the forming die and transfer die (the forming die moving about the shaft 4, and the transfer die moving in a general horizontal direction directly above, and also moving downwardly), brings the two dies into the relationship shown in Fig. 13 with the transfer die in contact with the article on the forming die. Here the dies are accurately aligned one with the other and they are held in this alignment and in registration for a considerable period of travel or movement of both the forming die 9 and the transfer die 33. During this period, the curvature or the shape of the cam tracks 43 is concentric with the shaft 4.

To insure that the transfer forming dies are aligned perfectly, and to remove any necessity of guide members on the dies themselves, guide rolls 62 are provided on each end of the transfer die carrier 41 to co-act with the indexing fingers 63 mounted on spider 64 affixed to the forming shaft 4, as shown best in Figs. 3 and 4. These indexing fingers 63 move at the same speed as the forming dies as both are affixed to the same shaft 4 and the rolls 62 straddle the indexing fingers 63 while the transfer die approaches and recedes from the forming die and a transfer of an article is effected. The two dies will thus travel during this period at the same speed and there will be no wear or interference between any parts of the transfer die or forming die, nor any necessity of guiding members on either die to cooperate with guiding members on the other die. Accurate indexing of the transfer die and forming die in a circumferential direction is thus assured. To provide for transverse alignment, rolls 45 (Fig. 4), are mounted on the transfer die carrier 41 to bear on the outside of cam track levers 44, to hold the carrier 41 and its transfer dies 33 accurately in an endwise position relative to the forming dies 9.

The co-action between the forming dies and the transfer dies with the molded article therebetween, continues through the position shown in Figs. 13 and 14. Fig. 15 shows the transfer dies separated from the forming dies, being still held in alignment with one another by means of the link 46 and its operating means. The cam levers 44 have been raised by mechanism already described to separate the transfer and forming dies and the article is being retained by suction on the transfer dies.

Fig. 16 shows the transfer die carrier 41 and transfer die 33 completely separated from the forming die 9 and moving towards the left by the links 46. In Fig. 17 carrier 41 and transfer die 33 have reached their extreme position at the left, being guided into this position by the cam tracks 43 which have been moved into proper position at this stage in the operation by the levers 55. At this point, which constitutes the take-off station, the article may be further treated and certain portions of it reshaped or reinforced, after which the article is removed by a take-off die mechanism hereinafter described.

After the article has been removed from the transfer die, the transfer die carrier 41 and its die 33 move toward the right, as indicated in Fig. 18, the levers 44 being held in their upper position during the time that the transfer die is passing to the right over the top or above the next succeeding die 9 which at this time is moving toward the left. When the carrier 41 with its transfer dies 33 reaches its extreme right-hand position, it has returned to the position shown in Fig. 11, and the entire process is repeated for the removal of a second set of articles from the forming dies to the transfer dies.

In Fig. 5, the dotted line 60 shows the general path taken by a transfer die during its travel toward the right in an elevated position and during its travel to the left in a path, a part of which coincides with the motion of the die 9 and a part of which coincides with the same path as its return travel to the right. The movement of the transfer die longitudinally of the apparatus may be referred to as reciprocatory.

Reference is again made to Figs. 11 to 18 inclusive with regard to the motion and operation of the take-off die, i.e., the die which removes the article from the transfer die and delivers it to a dehydrating mechanism. During the co-action of the take-off and transfer dies, portions of the article may be acted upon by mechanism associated with these dies as will later be described.

Considering first the motion of the take-off die 61 relative to the motion and positions of the transfer die 33. As seen in Fig. 11, the transfer die is about to enter coactive relation with a forming die 9. At this same time the take-off die 61, having secured an article on a preceding cycle from the transfer die 33, is moving in the direction of the arrow, and is about to bring that article into position to deposit it on a conveyor or other mechanism 67. In Fig. 12 the transfer die is about to co-act with a forming die, and at this time the take-off die 61, with an article thereon, is directly over the conveyor 67 and about to discharge the article onto this conveyor. In Fig. 13 the transfer die has co-acted a forming die and the take-off die, having discharged the articles to the conveyor, is moving upward in a clockwise direction about its axis to ultimately reach, through the motions indicated in Figs. 14 and 15, the position indicated in Fig. 16. In this position it is depressed below the travel path of the transfer die 33 which is now moving toward the left as was previously described, to arrive at its terminal position indicated in Fig. 17. After it reaches this position, the take-off die 61 is moved into co-active relation with said transfer die as shown in this figure. Certain treatments (which will be subsequently described), may then be performed, if desired, on certain portions of the article. The article is thereafter ejected from the transfer die by compressed air and retained on the surface of the take-off die 61 by suction applied therethrough, immediately after which the take-off die 61 returns to the position generally indicated in Fig. 16. The take-off die remains in this position until the transfer die has moved toward the right so as to clear the path of the take-off die and immediately thereafter the take-off die begins its movement to deliver the article to the conveyor as indicated in Fig. 18.

For purposes hereinafter stated, it is sometimes desired to deliver the article by means of the take-off die to more than one conveyor or other mechanism. In this case the path of the take-off die in relationship to the paths of the transfer die and the forming die is diagrammatically illustrated in Fig. 5. In this case the take-off die co-acts each time with the transfer die at the same position, but each alternate discharge is first to conveyor 67 and the second group of articles removed from the transfer die by the take-off die is delivered to the upper conveyor 66.

It is also sometimes desirable to so operate the take-off die as to distribute the articles in a sidewise or crosswise direction on the conveyor or conveyors. The mechanism whereby this is accomplished is shown best in Figs. 8 and 9. The take-off die 61 is rigidly supported on an arm 68. As shown best in Fig. 9, this arm has a bifurcated end through which extends a shaft 69 to which the arm is secured by pins 70, so that the arm of the take-off die rotates with the shaft 69 and about the axis thereof. The shaft 69 is journalled for oscillatory movement in a yoke 71 locked to a shaft 72 by a key or set screw 73. This shaft 72 is mounted in bearings, one of which is shown at 74. Oscillatory movement may be imparted to the yoke 71 to bodily shift the position of the shaft 69, by means of an arm 75 keyed to the shaft 72 and having a cam follower 76 operating in a cam race 77 in a cam 78 fixed on a shaft 79.

Lateral shifting of the take-off arm 68 is accomplished by axial movement of the shaft 72 to which the yoke 71 of said arm is locked. This shaft slides freely through the arm 75 and any suitable means may be provided for holding the arm 75 against lateral movement so that the follower 76 is never disengaged from the cam race 77. Axial movement is imparted to the shaft 72 by a lever 80. One end of this lever is secured by a pivot 81 to a bracket 82 fixed on the base of the machine, while the other end is forked to straddle a reduced portion 83 at the end of the shaft 72 (Figs. 8 and 9). The lever 80 is provided intermediate its ends with a cam follower 84 operating in a cam race 85, formed in a barrel cam 86 on a shaft 87.

The cam shaft 79 is keyed to a gear 5e which meshes with and is driven from gear 5d on main cam shaft 53. Cam shaft 87 is driven by gear 5f which meshes with gear 5e on shaft 79 (Figs. 1 and 2). The barrel cam is thus driven and serves, through its rotation, to move the shaft 72 axially in order that the take-off dies 61 may be moved from a central position, wherein they receive the articles A from the transfer dies 33, in either lateral direction to deposit the articles on either side or the other of the conveyors 66 and 67.

Pivotal movement of the take-off arm 68 with its shaft 69 is imparted by a pulley 88 oscillated by a belt 89 passing over a directional roll 90 and encircling a drive pulley 91 (Figs. 8 and 9). This drive pulley 91 has an elongated hub 92, freely rotatable on the shaft 72 adapted to move longitudinally therewith. A fixed collar 93 on said shaft serves to move the hub 92 to the left in Fig. 9 and said hub and its pulley 91 is moved to the right in this figure by the yoke 71, depending upon the direction of lateral movement of the shaft 72 and take-off die.

Embracing the hub 92 and keyed to it to rotate therewith, is a toothed quadrant 94, whose teeth mesh with the teeth at one end of a lever 95. This lever 95 has flanges 96 at its edges, so as to maintain the teeth of the lever and quadrant in mesh when the hub 92 is slid back and forth through said quadrant. The lever 95 is pivoted on the shaft 79 and its other end has a cam follower 97 operating in a race 98 of a cam 99 mounted on a shaft 53. The purpose of this quadrant, lever and cam is to pivotally move the take-off die 61 from the position shown in full lines in Fig. 5 in a counterclockwise direction to the dotted line positions in that figure, and vice versa.

The take-off mechanism described operates in the following manner: When the take-off die 61 receives the articles A from the transfer die 33, said take-off die occupies substantially the position shown in Fig. 8. At the instant an article is transferred from the transfer die to the take-off dies, compressed air is admitted to the transfer die through the connection 39 (Fig. 17) and suction is simultaneously communicated to the interior of the take-off die and is continued in the latter die until the article is discharged therefrom onto the conveyor 66 or 67, at which time compressed air is passed through the take-off die to facilitate the discharge of the article therefrom. I have not considered it necessary to show suction or compressed air connections with the take-off die as these may be conventional and may be readily supplied by those skilled in the art. They would ordinarily be in the form of flexible hoses.

As the article leaves the transfer die and is held on the take-off die, the latter die descends slightly to move out of the path of retractive movement of the transfer die, and, immediately thereafter, the transfer die commences its retractive movement to clear the path for the take-off die, and the cam 78 functions through the belt 89 to tilt the arm 68 of the take-off die upwardly. The function of these parts is to oscillate the take-off die through approximately 180 degrees, more or less, for the purpose of depositing the article right side up upon the conveyors 66 or 67. As the take-off die is being thus moved, the barrel cam 86 functions to shift the shaft 72 axially to line up the take-off die with either lateral half of the conveyor on which the article is to be deposited and, simultaneously with this operation, the cam 99 functions to oscillate the yoke 71 and thus so position the shaft 69 that the article will be deposited on the right conveyor. These trains of mechanisms thus serve to select not only the lateral half of the conveyor for deposit of the article, but also select the conveyor on which the article is to be placed. As a result, the article is deposited in staggered relation on both the upper and lower conveyors 66 and 67, as shown in Fig. 2, to provide a maximum utilization of conveyor space.

In Figs. 20 and 21 each transfer die 33 is shown as provided with a main chamber 34 back of its article engaging perforated face and arranged peripherally of this main chamber is a separate annular chamber 35 which is, in effect, an annular cylinder in which a ring like piston 36 is operable. This piston has channels 37 extending upwardly from its lower edge and radially to the inner surface of the piston. These channels are adapted to register at certain times with the channels 38 leading into the main chamber 34 of the die. The pipe connection 39 to the main chamber 34 of each transfer die provides for the introduction of either suction or compressed air into the main chamber 34 while a similar pipe connection 40 is provided for the annular chamber 35.

When a transfer die 33 engages with an article on a forming die, the main chamber 34 of the transfer die has suction applied through the pipe connection 39, so that the open ends 37a of the channels 37 which are in contact with the article A on the forming die and through which suction is being applied, will assist in the removal of the article from the forming die and its retention on the transfer die 33.

It is frequently desirable that many molded pulp articles, particularly those of the open faced type, to which the present invention is primarily directed, be provided around their free edges with appropriate flanges or thickened sections for reinforcing or other purposes. In the apparatus of the present invention, molded material for these sections is formed on the forming dies. The present invention provides means whereby this latter material may be reformed to constitute an integral reinforcing structure at the edge or other portions of the articles.

In the drawings, I have shown two forms of reforming mechanisms, namely, that of Figs. 22–25 and the modified form of Figs. 26–28. The structure and operation of the parts therein illustrated will now be explained. In Figs. 22 and 23, the transfer die 33 is shown as described in connection with Figs. 19–21, but a novel form of take-off die is illustrated and is so constituted as to provide for reforming of a portion of the article A to produce a reinforced edge.

In this form of the invention, each take-off die 61 is provided with a main chamber 120 having a pipe connection 121 through which suction may be provided within the chamber 120 or compressed air may be admitted thereinto. Encircling the main chamber is an annular chamber 122 forming, in effect, an annular cylinder in which is positioned an annular piston 123, in many respects similar to the piston 36 but inverted. The piston 123 has channels 124 extending upwardly from its lower end and then laterally to its inner surface. The connection 125 provides for suction within the annular cylinder 122 or for the admission of compressed air thereinto. Through the manipulation of the parts described in connection with Figs. 22 and 23, a portion of the article may be reformed or reshaped while the transfer and take-off dies are in engagement with the upper and lower surfaces, respectively, of the body of such article.

Such engagement is insured by a pressure bar 126 (Figs. 1–3). This pressure bar extends transversely across the machine beneath the forward terminal position of the transfer die and is supported at its opposite ends on upright rods 127 guided in upstanding brackets 128. The lower ends of these rods are connected to levers 129 mounted on the shaft 56 and carrying intermediate their ends cam followers 130 adapted to cooperate with cams 131 fixed on the shaft 53 (Fig. 3). The pressure bar 126 is normally lowered out of the path of the take-off die, but the operations of the cams 131 are so timed that, just before the reforming period, they will operate to elevate the pressure bar against the under side of the take-off die 61 and hold it firmly in position until the reformation is completed, whereupon the bar will be again retracted out of the path of the take-off die.

The actual reforming or reshaping operations according to Figs. 22 and 23, with respect to each pair of mating dies are as follows: At the commencement of reforming, the parts appear as in Fig. 22 with the dies in contact with the body of the article, the piston 36 engaging with the upper surface of the article flange $a$, and said flange resting upon the upper surface of the piston 123 which, at this time, is in lowered position. Suction is now applied to chamber 35 which lifts piston 36 to the position shown in Fig. 23.

With these dies in this relation, compressed air is now admitted to the chamber 122 beneath the piston 123 and, as shown in Fig. 23, this piston is thereby forced upwardly, carrying with it the outer margin of the flange $a$, with the result that that margin is upturned as shown at $a'$ in Fig. 23, and the ends of pistons 123 and 36 are in contact. As this operation occurs, compressed air from the chamber 122, traverses the channel 124 and blows the upturned end $a'$ from the full line upstanding position of Figs. 23 and 24 into the dotted line position of Fig. 23, thereby freeing it from frictional contact with the inner surface of piston 123. In other words, this operation tends to fold the margin of the flange inwardly against the body of the article with the result shown in Fig. 25, this being assisted by vacuum applied to chamber 120 which will tend to hold the reshaped flange in this position. This is the preferred shaping of the reinforcing edge in this form of the invention, although, if a reinforcing margin $a'$ is desired to be formed as shown in Fig. 24, this may be accomplished by utilizing only sufficient air pressure through channels 124 as will free the article from contact with the piston and by lowering the piston 123 immediately thereafter to admit air to the space between the reshaped flange and the body of the article.

Having formed the reinforcing edge as shown in either Fig. 24 or 25, the reforming operation is complete, the pressure bar 126 is withdrawn, and compressed air is admitted to one or both chambers 34 and 35 of the transfer die 33. Suction is admitted to the main chamber 120 of the take-off die 61, and the article is thus transferred from the transfer die 33 to the take-off die 61.

In the modified form of reforming apparatus shown in Figs. 26, 27 and 28, each of the take-off dies 61 is of the same construction as shown in Figs. 22 and 23, but each transfer die, designated 33$a$ in these figures, is constructed differently from the corresponding die 33 of the preceding figures. That is to say, instead of having only a single annular chamber 35 and a cooperating piston 36, as in the preceding figures, die 33$a$ has an additional annular chamber 132 about the main chamber 34 of such transfer die. In this added chamber is positioned an annular piston 133 having passage 134 which, in the retracted position of the piston, registers with passages 135 communicating with the main suction compression chamber 34 of the die.

In operating the type of transfer die 33$a$ of Figs. 26–28, the mechanism performs initially as described in connection with Figs. 22 and 23. In other words, the parts function to turn up the margin $a'$ of the flange $a$ of the article A, as shown in Fig. 26. While this is being done, suction is imparted to the chamber 132 through a connection 136 to keep the annular piston 133 elevated. However, as soon as the marginal portion $a'$ of the flange $a$ has been turned up, as shown in Fig. 26, suction through the connection 136 is discontinued and compressed air is applied through said connection. This forces the piston 133 downwardly against the upturned edge of the margin $a'$ to reform said edge into the tightly compacted form shown at $a^2$ in Fig. 27.

Reference has been made to the use of air pressures both below and above atmospheric pressure for performing various functions and operations by various parts of the mechanism of this apparatus. Vacuum or suction is employed at various stages to effect the initial formation from the dilute fibre mixture and to remove both water and air from the product at various stages of subsequent operations. The initial control of the formation suction is by means of a stationary valve member 11 with ported openings therein cooperating with similar ported openings in the forming die mounting drum 8. Proper timing of the formation vacuum is obtained through the cooperation of this rotating valve mechanism.

To assist in the transfer of the article from the forming die to the transfer die after the valve mechanism previously mentioned has shut off the vacuum or negative atmospheric pressure from the chamber 10 behind dies 9, air above atmospheric pressure is delivered to chamber 10 through pipe 10$a$. Similarly, vacuum is applied to pipes 39 to the transfer die at this point in the operation. Plus or minus atmospheric pressures may be applied to the perforations in solidification die 12. Also, pressures above and below atmosphere are applied to the transfer and take-off dies in proper sequence to assist the proper transfer of the article from one die to the other, for the reshaping of certain portions of the article during the cooperation of the transfer and take-off dies, and to finally discharge the article to the dehydration conveyors.

This control of air above and below atmospheric pressure is effected and timed by a valve mechanism comprising of a number of valves 137, operated in timed sequence by a plurality of cams 138 mounted on a shaft 139. This shaft is constantly driven by any convenient means such as a chain belt 140, by sprocket 5$g$ on shaft 87, and a sprocket 5$h$ on valve shaft 139.

Any type of valve suitable for controlling flows of air and vacuum to the various parts of the machine mechanism may be used, although I prefer to utilize a mechanically operated valve of the poppet type, where the valves are opened periodically by means of cams of suitable size and length, located in proper sequence on the shaft 139.

Connections can readily be made from the several valves 137 to various parts of the apparatus, where this air is utilized, by means of pipes or conduits, some of these being flexible to provide for connection to moving mechanism parts.

The several mechanisms herein before described are driven through one gear train, shown best in Fig. 1 and operating as follows:

The entire apparatus is driven from the motor 7 on which shaft is a pinion 6. This drives gear 5 mounted directly on the forming shaft 4.

Cam shaft 21, which operates the solidification die mechanism, is driven from gear 5 through an intermediate gear 5a with a gear ratio resulting in the gear 5a rotating five complete revolutions for one complete revolution of gear 5 on the forming shaft 4.

Main cam shaft 53 is driven by gear 5d meshing with an intermediate gear 5c which meshes with the forming or main gear 5. The ratio here is such that the gear 5d also makes five revolutions for each revolution of the gear 5 on the forming shaft 4.

Cam shaft 79 is driven by gear 5e meshing with gear 5d on the main cam shaft 53, these gears being of such ratio that the cam shaft 79 on which gear 5e is mounted rotates one-half revolution for each complete revolution of gear 5d and main cam shaft 53.

Cam shaft 87 is driven by gear 5f meshing with gear 5e at a ratio of one to one so that cam shaft 87 also makes one-half revolution for each complete revolution of shaft 53.

The valve cam shaft 139 is driven from cam shaft 87 through a chain belt 140 by means of a sprocket 5g on shaft 87 and a sprocket 5h on the valve cam shaft 139, one-half the diameter of sprocket 5g on shaft 87. This results in a complete rotation of valve cam shaft 139 or each complete rotation of main cam shaft 53.

While the foregoing operations, which have been described in the integrated process for producing a molded fibre article, have removed by far the greater amount of water or other liquid with which the process started, there still remains in the article an excess amount of water or other liquid which must be removed to prepare the article for commercial use. To do this, I prefer to dehydrate the article at this stage through the use of superheated steam in contradistinction to the generally employed use of hot dry air, and to eliminate, insofar as possible, air as such from the dehydrating process.

It will be noted that vacuum has been employed throughout the earlier stages of this integrated process to remove the water, air, and/or other gases from the product in as great amounts as possible. In certain instances, the article, or the major portion of it, has been further solidified by a solidification die which acted to both remove additional liquid and to eliminate voids, air bubbles and cavities within the article, which add nothing to its serviceability and interfere to a considerable extent with the dehydrating process.

It is a recognized fact that air is more of an insulator against heat than a conductor of heat, and that a very thin film of air, particularly if it is fully saturated with moisture vapor, effectively shields further removal of water by air evaporation from any part of the articles. If air is used for drying, it must preferably be employed at fairly high temperatures and blown against the article with sufficient force to break up the saturated air film if any efficiency of drying or economies of operation are to be attained. When this is done, the dry air impinging with considerable force on the surface of a fibrous product, tends to over-dry, sear or burn the fibres directly at or near the surface, injuring their quality and largely preventing them from acting as conductors of liquid or liquid vapor from the interior of the article to the surface. In other words, they have an isolating effect, retarding to a very marked extent, further drying, this phenomenon being commonly known as "case-hardening." Moreover, air as such does not have the heat carrying qualities capable of steam, and particularly superheated steam, hence much more air must be circulated to carry away the same amount of moisture or moisture vapor than is necessary where a more efficient medium such as superheated steam is employed.

The dehydrating mechanism which I prefer to employ in connection with this completely integrated and interlocked process is illustrated generally in Fig. 29. This illustration is largely diagrammatic for purposes of a simplified showing of this portion of the mechanism.

It comprises a suitable housing 100 provided with conveyors 66 and 67, which pass completely through the length of the housing and extend for a short distance beyond each end thereof. Each of these conveyors is operated in timed relation with the take-off mechanism through any suitable driving connections.

A plurality of molded articles A, from which the major portion of the water or other liquid has been extracted, are supplied to and deposited on one end of each of these conveyors by the take-off die, as already described. These articles are preferably delivered at two levels or on two conveyors at different levels, and also are preferably distributed transversely of the conveyors, as hereinbefore stated, the object of this being to reduce the speed of lineal travel of the conveyors 66 and 67 to either one-half or one-quarter of the conveyor travel speed which would otherwise be necessary if the articles were deposited one behind the other on a single conveyor.

Mounted within the chamber 101 of the housing and parallel to each of the conveyors are a series of ducts 102. These ducts are here shown on only the upper side of the conveyor which is transporting the articles, but they also may be used on the underside, as well as the upper or article conveying side of each conveyor, when and if this may be necessary or desirable in special cases. Normally, however, ducts on the upper side are adequate.

The bottom walls of these ducts 102, directly over the articles being conveyed through the chambers by conveyors 66 and 67, are perforated at 103 in any manner or arrangement which is desirable, so that, when superheated steam is admitted to the interior of the ducts 102, it is forced through these perforations and distributed directly over and around the articles traveling directly beneath so that there is maintained an elevated temperature in this particular area, this temperature being controlled by suitable means and maintained at any desired elevation.

The superheated steam thus delivered into the dehydrating chamber 101 is exhausted by circulating fan 104 through ducts 105 and 106 and returned through duct 107 and reheater 108 to the pressure ducts 102.

This circulation is extremely rapid so that the superheated steam, which is cooled somewhat through contact with the articles on the conveyors, is reheated so that its affinity for moisture is maintained.

The length of the dehydrating chamber 101 of the housing 100 may be varied for different types of products and different kinds of materials and operations. Temperature control, time of exposure of articles to the dehydrating medium and rapidity of recirculation afford a wide range of adjustments to meet various conditions. Normally, it is adjusted so that the liquid remaining in the product after delivery from the molding and treating mechanisms is reduced to nearly an optimum level approaching that desired in the finished product. At this time, the articles on the conveyors pass from chamber, through a dividing partition 109, into chamber 110 at the other end of the housing.

The chamber 110, which constitutes the conditioning chamber, has pressure ducts 111 similar to those ducts 102 of the dehydrating chamber. These pressure ducts 111 have perforations or openings 112 in their lower faces to distribute a vapor fluid over and around the articles being transported through this chamber by the conveyors 66 and 67.

Circulation is maintained in a manner similar to that for the chamber 101, in this case by means of fan 113, which draws vapor fluid both from the chamber 110, through a pipe 114, and certain quantities of superheated steam from chamber 101 through pipe 115, dampers in both of these pipes effecting such adjustment and proportion of these two media to the fan 113, as may be desired.

This fan 113 discharges through pipe 116 vapor to the pressure ducts 111, to maintain any desired vapor condition on and around the articles on the conveyors by means of this vapor being forced from openings or perforations in the faces of these pressure ducts immediately adjacent to the articles on these two conveyors.

Interposed in the duct leading from the fan 113 to the pressure ducts 111 may be a combination heating or cooling section 117 to further regulate and control the temperature of the steam vapor being supplied to chamber 110.

While in the dehydrating chamber 101, the temperature of the superheated steam vapor may be maintained several hundred degrees above its saturation point (212 degrees Fahrenheit), the temperature of the steam vapor in chamber 110 is preferably maintained considerably less, and may under certain conditions approach the condensation temperature of 212 degrees Fahrenheit.

The temperature in the chamber 110 is regulated first by the dampers in ducts 114 and 115, to draw only such high temperature vapor from the chamber 101 through pipe duct 115 as may be necessary to maintain the desired temperature in the conditioning chamber 110. The remainder of the steam vapor is recirculated through the duct 114, fan 113 and ducts 116 and 111.

While the articles remain in chamber 101 they are exposed to superheated steam at elevated temperatures which acts to heat the article and liquid contained therein very rapidly, so that such liquid converted into vapor or steam makes its way to the article surface. As soon as this vapor reaches the article surface, it is absorbed immediately by the superheat in the surrounding media. By the time that the articles have passed through chamber 101 and reach the partition 109 between chambers 101 and 110, most of the liquid in said articles, when they entered chamber 101, will have been absorbed as water vapor by the superheated steam.

While in this condition the articles pass immediately into chamber 110 and here the rapidly escaping vapor from the highly heated article is absorbed less rapidly by the surrounding vapor medium due to the fact that the temperature of such vapor in chamber 110 does not have the absorbing qualities or affinity for water vapor that the higher temperature superheated steam had in chamber 101. Where there is a greater amount of vapor escaping from some portion of the article, due to the greater amount of liquid remaining in the interior of the article, there is sufficient temperature in the vapor in chamber 110 to absorb this and carry it away from the article surface. Other portions of the article which may have vapor escaping at a lesser rate may have the moisture removal much more retarded, hence, there is an equalization or normalizing of the moisture content within the article so long as it remains within this chamber 110. This is particularly true as the temperature of the superheated vapor in this chamber reaches or approaches the condensation point of 212 degrees Fahrenheit.

It will be seen, therefore, that the articles are first subjected to high temperature superheated steam in chamber 101 for rapid heating and removal of the major portion of the moisture or liquid remaining in the article, in the form of water vapor. It will also appear that the chamber 110 provides a conditioning or normalizing period during which any unevenness of liquid or water distribution in the article has a chance to readjust itself so that by the time the article is delivered from chamber 110, it is thoroughly conditioned for the use for which it was intended.

In order to prevent outside air from reaching the dehydrating chamber 101 and the conditioning chamber 110, air locks are provided at the atmospheric end of each of these chambers, and heat and vapor locks may also be provided in the partition 109, when and if this is necessary or desirable. These locks are shown in greater detail in Fig. 29 and operate generally as follows:

Walled conduits 141 are provided at each end of the housing 100. These conduits are of substantial length in the direction of the travel of the conveyors 66 and 67. Approximately midway of the length of these conduits are openings 142 which extend the entire width of the housing opening through which the conveyors 66 and 67 pass. The size of each opening 142 is regulated by a sliding damper 143.

Each of the conduits 141 is provided with an outlet 144 with an associated fan or blower to remove the water vapor or air which may attempt to pass between adjacent conduits 141. The amount of water vapor and/or air which is exhausted from conduits 141 is regulated by the position of the sliding dampers 143 at each of the openings 142.

The dampers 143 are so adjusted that all of the steam vapor which is escaping through any of the passages 145 from the inside of the dehydrator chamber 101 is drawn through the openings 142 and exhausted through the conduits 141. Similarly, any small quantity of atmospheric air from outside of the housing which may meander into any of the outside passages 146 will also be drawn through the openings 142 and exhausted through conduits 144.

In actual operation, it is undesirable to have any great quantities of the high temperature steam vapor escape from the dehydrating chamber 101 into the room or area outside of the housing 100. Therefore, under normal adjustment of the dampers 143, there may be a small quantity of room air purposely drawn in through openings 146 and exhausted outside of the housing 100 and outside of the building in which the apparatus is operated by the fans in the manner stated. It will therefore be apparent that little or no atmospheric air can enter the dehydrating chamber 101.

Under normal conditions, the water vapor which is driven off or removed from the freshly delivered articles, and which is circulated through a superheater to maintain it at the desired temperature is enough to maintain the entire dehydrating chamber 101 practically free from air. However, in the event that this steam vapor generated from the articles being dehydrated, is not sufficient for this purpose, additional superheated steam may be introduced into the dehydrating chamber 101 from any convenient source.

It is, of course, realized that such a dehydrating mechanism operating at the high rates of dehydration of water removal which it does, turns a very substantial amount of water into superheated steam extremely rapidly, hence some escape is necessary, otherwise disastrous pressures would be built up in the housing 100. Heating tunnels and ovens employing air as the medium for drying the articles, usually provide an escape stack at the top of the tunnel or oven, which encourages air necessary for this method to be drawn in through any other openings into the inside thereof and to carry away the evaporated moisture. However, according to this invention, every effort is made to remove air from the article while it is being produced from the very dilute liquid pulp mixture. The entire process is directed all the way through toward an air-free method, where air is intentionally excluded, as far as practically possible, from the article during the several production operations and during the subsequent operations of dehydration.

If desired, a lock of the same general character as hereinbefore described may be installed or utilized in the partition 109 as shown. This latter lock is interposed in the partition 109 between the chambers 101 and 110 for the purpose of limiting the passage of superheated steam from the dehydrating chamber into the conditioning chamber, as indicated by the arrows shown in the lock.

As hereinbefore stated, the articles may be so treated in the conditioning chamber as to be discharged therefrom ready for use or, optionally, in condition for further and final refinishing. In the latter case, the articles, undried and still containing considerable water of formation are passed from the conditioning chamber immediately and directly to hot refinishing dies, two couples of which are shown schematically in Fig. 29, one for articles from the upper conveyor and the other for articles from the lower conveyor. Each of these couples comprises an upper die D¹ and a lower die D².

In practice, I preferably heat the upper dies D¹ and provide them with smooth article contacting surfaces, so that the upper surfaces of the articles will be provided with a smooth die dried finish, while any moisture that may be contained in the article and flashed into steam by the hot upper dies, may escape through perforations in the lower dies D². This relation, however, may be reversed, depending upon which side of the article it is desired to have the finer surface texture and finish. These dies apply sufficient pressure to the articles to effectually consolidate the surface strata thereof and effect a permanent fixation thereof in a permanently smooth surface finish. The articles are delivered from these dies ready for commercial use.

I am aware that articles, after having been dried in an air drier, have been subsequently subjected to pressure between heated dies. In some instances, the air dried articles have been re-wetted before such die treatment, while in others it has been suggested to dispense with the re-wetting before acting upon them with heated dies. My experience has shown that neither of these procedures can either permanently relieve the internal stresses in an article which cause warping and other deformation, or produce a permanently smooth surface finish thereon, for the reasons hereinbefore explained.

According to the present invention, in contradistinction, the articles are uniformly moisture conditioned in the conditioning chamber to free them from internal stresses and they are thereupon immediately placed, while in such moist condition, between the heated dies to be effectually acted upon thereby to dry and impart to them a fixed and permanent shape and a fine permanent hot die dried surface finish.

The articles are removed from the die D¹ and D² in condition to be packaged for the market and, while I have shown the die finishing step as diagrammatic, it will be understood that it is synchronized with the other operating parts of the complete machine and that the end products are delivered to stacking or packaging mechanism in a completely automatic manner.

In Fig. 4 and other figures of the drawings, the transfer die 33 is shown as mounted rigidly upon the transfer die carrier 41. In some instances, I prefer to so mount the transfer die. However, in other cases it is desirable to mount the transfer die on its carrier in such manner as to permit it to be axially adjusted relative to the carrier and to also provide for the imposition of elastic pressure upon such die, so that pressure may be imposed by said die on an article on a forming die 9 during co-operation between these dies, and this pressure adjusted to meet the desired conditions. In Fig. 36 I have illustrated the latter type of mechanism.

Fig. 36 is a fragmental section through a portion of the the forming drum 8, one forming die 9 carrying thereon an article A, and a transfer die 33 with the mechanism for mounting said transfer die on its carrier 41. Here, the transfer die 33 is fixed to a piston rod 147 having a piston 148 operating in a cylinder 149, which cylinder is affixed to the transfer die carrier 41 in any suitable manner. The piston rod 147 extends entirely through the cylinder 149 and has at its extending end adjusting nuts 150 which bear against the top end of the cylinder head for the purpose of positioning the rod 147 and the transfer die carrier 33 relative to the position of the transfer die carrier 41. To maintain the position of this transfer die, air or other medium is introduced into the upper portion of the cylinder through pipe 151. The pressure imparted to the piston 148 operating in the cylinder 149 can be adjusted by a suitable control of pressure through pipe 151, so that where a compressive effect is desired on the article A, when interposed between the transfer die 33 and the forming die 9, the desired pressure can be regulated. Under certain conditions, it is desirable to separate the coaction of the transfer die 33 and the forming die 9.

This may be desirable at various times when it is convenient to definitely remove the transfer die from the path of operation of the forming dies to permit continued operation of the forming dies without bringing about their coaction with the transfer die. To accomplish this result, it is only necessary to relieve air pressure above the piston 148 and admit pressure through the pipe 152 below the piston in order to raise the transfer die to the elevated position shown in dotted lines in Fig. 36 wherein it will be completely removed from cooperative relation with the forming dies, notwithstanding continued operation of the apparatus.

While I have here shown a cylinder controlling the operation of a single transfer die one cylinder or a plurality of cylinders may be used to control a plurality of transfer dies which may be mounted on the carrier for conjoint operation.

The apparatus of this invention embodies numerous novel features of construction, some of which are embodied in individual parts of the apparatus, and others of which comprise the interaction of a plurality of parts. Some of these novel features may be employed in machine of the character described without necessarily employing all of them and this invention is therefore to be understood as fully commensurate with the appended claims.

Furthermore, one or more novel steps of the methods hereinbefore described may be employed in some instances without necessarily employing all of them and the method aspect of this invention is therefore also to be understood as fully commensurate with the appended claims.

Having thus fully described the invention, what I claim as new and desire to secure by Letters Patent is:

1. An apparatus of the character described comprising: a succession of suction forming dies arranged in annular sequence and mounted to constantly rotate about a common axis, a tank containing a pool of pulp fibre through which said dies successively pass to accrete pulp articles during said passage, a solidification die mounted above the surface of said pulp fibre pool, means for moving said solidification die into and out of engagement with the freshly molded article on each of the forming dies in succession as they leave the pool and for holding said solidification die against each such article during a portion of the rotary movement of the forming dies, a transfer die, means for reciprocating the transfer die back and forth along a path of travel a portion of which is coincident with the path of travel of the forming dies to there travel in mating relation therewith for a distance and thereupon remove the articles from the forming dies in succession and convey them to a take-off station, a dehydrator with means for circulating superheated steam therethrough, a take-off die for removing successive articles from the transfer die at the take-off station and delivering them to the dehydrator, means for operating said take-off die, a conditioning chamber at the discharge end of the dehydrator and isolated therefrom to normalize and re-distribute the moisture content of the articles therein, means for passing the articles through the dehydrator and conditioning chamber in succession and for discharging them from the latter, and a refinishing die couple positioned to immediately receive and compress articles after they leave the conditioning chamber to dry said articles and provide them with a smooth surface finish.

2. An apparatus of the character described comprising: a succession of suction forming dies arranged in annular sequence and mounted to constantly rotate about a common axis, a tank containing a pool of pulp fibre through which said dies successively pass to accrete pulp articles during said passage, a solidification die mounted above the surface of said pulp fibre pool, means for moving said solidification die into and out of engagement with the freshly molded article on each of the forming dies in succession as they leave the pool and for holding said solidification die against each such article during a portion of the rotary movement of the forming dies, a transfer die, means for reciprocating the transfer die back and forth along a path of travel a portion of which is coincident and concentric with the path of travel of the forming dies to there travel in mating relation therewith for a distance and thereupon remove the articles from the forming dies in succession and convey them to a take-off station, a dehydrator with means for circulating superheated steam therethrough, a take-off die for removing successive articles from the transfer die at the take-off station and delivering them to the dehydrator, means for operating said take-off die, a conditioning chamber at the discharge end of the dehyrator and isolated therefrom to normalize and re-distribute the moisture content of the articles therein, and means for passing the articles through the dehyrator and conditioning chamber in succession and for discharging them from the latter.

3. An apparatus of the character described comprising: a succession of suction forming dies arranged in annular sequence and mounted to constantly rotate about a common axis, a tank containing a pool of pulp fibre through which said dies successively pass to accrete pulp articles during said passage, a transfer die, means for reciprocating the transfer die back and forth along a path of travel a portion of which is coincident with the path of travel of the forming dies to there travel in mating relation therewith for a distance and thereupon remove the articles from the forming dies in succession and convey them to a take-off station, a dehydrator with means for circulating superheated steam therethrough, a take-off die for removing successive articles from the transfer die at the take-off station and delivering them to the dehydrator, means for operating said take-off die, a conditioning chamber at the discharge end of the dehydrator and isolated therefrom to normalize and re-distribute the moisture content of the articles therein, means for passing the articles through the dehydrator and conditioning chamber in succession and for discharging them from the latter, and a refinishing die couple positioned to immediately receive and compress articles after they leave the conditioning chamber to dry said articles and provide them with a smooth surface finish.

4. An apparatus according to claim 3, wherein at least one of the dies of the refinishing die couple is heated to impart to the surface of each article a die dried finish.

5. An apparatus according to claim 3, wherein one of the dies of the refinishing die couple is heated to impart to each of the articles a die dried finish and at least one of which dies is perforated to permit the exit of steam generated during the operation of said dies on the articles.

6. An apparatus according to claim 3, wherein a plurality of conveyors are mounted to travel through the dehydrator and conditioning chamber to pass the articles therethrough, and wherein the take-off die deposits articles on said conveyors selectively.

7. An apparatus according to claim 3, wherein a plurality of conveyors are mounted to travel through the dehydrator and conditioning chamber to pass the articles therethrough, and wherein the take-off die deposits articles on said conveyors selectively and in spaced apart relation transversely of each conveyor.

8. An apparatus of the character described comprising: a succession of suction forming dies arranged in annular sequence and mounted to constantly rotate about a common axis, a tank containing a pool of pulp fibre through which said dies successively pass to accrete pulp articles during said passage, a transfer die, means for reciprocating the transfer die back and forth along a path of travel a portion of which is coincident with the path of travel of the forming dies to there travel in mating relation therewith for a distance and thereupon remove the articles from the forming dies in succession and convey them to a take-off station, a dehydrator with means for circulating superheated steam therethrough, a take-off die for removing successive articles from the transfer die at the take-off station and delivering them to the dehydrator, means for operating said take-off die, a conditioning chamber at the discharge end of the dehydrator and isolated therefrom to normalize and re-distribute the moisture content of the articles therein and sufficiently reduce the moisture content to render the article ready for commercial use.

9. An apparatus of the character described comprising: a succession of suction forming dies arranged in annular sequence and mounted to constantly rotate about a common axis, a tank containing a pool of pulp fibre through which said dies successively pass to accrete pulp articles during said passage, a pivoted guide extending in a generally tangential direction to the path of the forming dies and radially spaced therefrom, a transfer die on said guide, means for moving said transfer die back and forth longitudinally of said guide, and means for pivotally moving said guide to bring the transfer die into mating relation with each rotating forming die while the transfer die is moving in one direction to permit transfer of articles from the forming dies to the transfer die.

10. An apparatus according to claim 9, wherein the transfer die has an article engaging face provided therein with an annular cylinder, an annular piston in said cylinder, and means for operating said piston.

11. An apparatus according to claim 9, wherein there is a solidification die between the tank and the transfer die, with means for moving said solidification die into and out of engagement with the freshly molded article on each of the forming dies in succession as they leave the pool and for holding said solidification die against each such article during a portion of the rotary movement of the forming dies.

12. An apparatus of the character described comprising: a drum having a succession of suction forming dies arranged in annular sequence and mounted to constantly rotate about a common axis, a tank containing a pool of pulp fibre through which said dies successively pass to accrete pulp articles during said passage, a pair of supporting arms provided with parallel tracks and mounted for tilting movement on a common pivotal axis, a transfer die carrier having rollers engaging said tracks, a transfer die supported on said carrier, means for reciprocating the carrier longitudinally of said tracks and for tilting said arms to cause the transfer die to traverse a loop-shaped path a portion of which is coincident and concentric with the path of travel of the forming dies and to there travel in mating relation therewith for a distance and thereupon remove the articles from the forming dies in succession.

13. An apparatus according to claim 12, wherein the transfer die is mounted for axial movement on its carrier.

14. An apparatus according to claim 12, wherein the transfer die is supported on a piston within a cylinder supported upon the carrier, in combination with means for admitting fluid under pressure selectively to either side of the piston.

15. An apparatus according to claim 12 provided with indexing means interposed directly between the drum and the transfer die carrier for accurately registering the forming and transfer dies while coacting with one another.

16. An apparatus according to claim 12, wherein said tracks have curved portions to maintain the transfer die in parallel relation to the forming die while said dies are in mating relation.

17. An apparatus of the character described comprising: a tank containing pulp fibre, a continuously rotating former drum having a suction forming die mounted thereon and rotatable with the drum to dip into the pulp fibre and accrete a pulp article therefrom, a transfer die, means for reciprocating said transfer die back and forth along a generally horizontal path, means for operating the transfer die along said path to engage it with the article on the rotating forming die and remove the article from said die and convey it to a remote take-off station, a take-off die, means for operating the take-off die to engage it with the article on the transfer die at the take-off station and to remove the article from the transfer die at said station, and cooperating means on the transfer die and the take-off die for reforming the margin of the article into a reinforced edge while the article is held between the transfer and take-off dies at said take-off station.

18. Apparatus according to claim 17, provided with means for forcing the take-off die tightly against the article on the transfer die at the take-off station during the reforming of the margin of said article.

19. Apparatus according to claim 17, wherein the means for reforming the margin of the article comprises annular sleeve-like pistons carried by the transfer and take-off dies.

20. Apparatus according to claim 17, wherein the means for reforming the margin of the article comprises pneumatic annular sleeve-like pistons operable in timed succession upon the margin of the article, and means for timing the operations of said pistons.

21. Apparatus according to claim 17, wherein the means for reforming the margin of the article comprises pneumatic annular sleeve-like pistons operable upon the margin of the article to deflect said margin and then compress the deflected margin.

22. An apparatus of the character described comprising: a succession of suction forming dies arranged in annular sequence and mounted to constantly rotate about a common axis, a tank containing a pool of pulp fibre through which said dies successively pass to accrete pulp articles during said passage, a solidification die above the surface of the pool, means for moving the solidification die into and out of engagement with the forming dies in succession as they pass through the zone of the solidification die, and an elongated arcuate guide for guiding the solidification die for movement along a path concentric with and also coincident with an arcuate portion of the path of travel of the forming dies while the solidification die is in engagement with the forming dies, and means for reciprocating the solidification die back and forth along said path in the same and contra directions to the direction of rotation of the forming dies, whereby said solidification die is caused to travel in prolonged contact with the freshly molded article on each individual forming die.

23. An apparatus of the character described comprising: a succession of suction forming dies arranged in annular sequence and mounted to constantly rotate about a common axis, a tank containing a pool of pulp fibre through which said dies successively pass to accrete pulp particles during said passage, a solidification die above the surface of the pool, means for moving the solidification die into and out of engagement with the forming dies in succession as they pass through the zone of the solidification die, and means for guiding the solidification die for movement along a path concentric with and also coincident with an arcuate portion of the path of travel of the forming dies while the solidification die is in engagement with the forming dies, and means for reciprocating the solidification die along said path in the same and contra directions to the direction of rotation of the forming dies, whereby said solidification die is caused to travel in prolonged contact with the freshly molded article on each individual forming die, said means for guiding the solidification dies comprising arcuate tracks which are moved toward and away from the axis of rotation of the forming dies to engage the solidification die with and disengage it from articles on the forming dies, said tracks being concentric with the axis of rotation of the forming dies when they are at their closest spacing from said axis.

24. An apparatus of the character described comprising: a succession of suction forming dies arranged in annular sequence and mounted to constantly rotate about a common axis, a tank containing a pool of pulp fibre through which said dies successively pass to accrete pulp articles during said passage, a solidification die above the surface of the pool, means for moving the solidification die into and out of engagement with the forming dies in succession as they pass through the zone of the solidification die, and means for guiding the solidification die for movement along a path concentric with and also coincident with an arcuate portion of the path of travel of the forming dies while the solidification die is in engagement with the forming dies, and means for reciprocating the solidification die along said path in the same and contra directions to the direction of rotation of the forming dies, whereby said solidification die is caused to travel in prolonged contact with the freshly molded article on each individual forming die, said means for guiding the solidification dies comprising arcuate tracks which are concentric with the axis of rotation of the forming die while the solidification die is in engagement with an article on a forming die.

25. In an apparatus for making pulp articles wherein the pulp articles are treated on forming dies, removed from said forming dies in succession by a transfer die, and transported thereby to a remote take-off station for removal therefrom and subsequent drying, the improvement which comprises: a plurality of superimposed conveyors the receiving ends of which are spaced from the take-off station, and a pivoted take-off die with means for pivotally moving said take-off die from the take-off station into proximity with the individual conveyor selectively, and means to shift said take-off die laterally to deposit articles therefrom to different parts of the width of the selected conveyor.

References Cited in the file of this patent

UNITED STATES PATENTS

| | | |
|---|---|---|
| 1,151,843 | Willard | Aug. 31, 1915 |
| 1,286,591 | Grunwald | Dec. 3, 1918 |
| 1,707,429 | Chaplin | Apr. 2, 1929 |
| 1,788,944 | Chaplin | Jan. 13, 1931 |
| 1,845,831 | Chaplin | Feb. 16, 1932 |
| 1,848,055 | Chaplin | Mar. 1, 1932 |
| 1,864,919 | Martlin | June 28, 1932 |
| 1,894,089 | De Reamer | Jan. 10, 1933 |
| 1,956,975 | Belcher | May 1, 1934 |
| 1,959,662 | Ellis | May 22, 1934 |
| 2,023,200 | Huff | Dec. 3, 1935 |
| 2,149,879 | Mitchell | Mar. 7, 1939 |
| 2,163,585 | Chaplin | June 27, 1939 |
| 2,192,937 | Shepard | Mar. 12, 1940 |
| 2,234,979 | Randall et al. | Mar. 18, 1941 |
| 2,307,022 | Chaplin | Jan. 5, 1943 |
| 2,333,236 | Dreisel | Nov. 2, 1943 |
| 2,359,201 | Chaplin et al. | Sept. 26, 1944 |
| 2,369,488 | Perry | Feb. 13, 1945 |
| 2,408,734 | Chaplin | Oct. 8, 1946 |
| 2,420,739 | Dorsch | May 20, 1947 |
| 2,629,533 | Chaplin | Feb. 24, 1953 |
| 2,704,493 | Randall | Mar. 22, 1955 |